US012761963B2

(12) United States Patent
Shveidel et al.

(10) Patent No.: US 12,761,963 B2
(45) Date of Patent: Oct. 13, 2026

(54) MULTI-LEVEL POLLING TECHNIQUES

(71) Applicant: Dell Products L.P., Hopkinton, MA (US)

(72) Inventors: Vladimir Shveidel, Pardes-Hana (IL); Lior Kamran, Rishon LeZion (IL); Amitai Alkalay, Kadima (IL)

(73) Assignee: Dell Products L.P., Hopkinton, MA (US)

( * ) Notice: Subject to any disclaimer, the term of this patent is extended or adjusted under 35 U.S.C. 154(b) by 355 days.

(21) Appl. No.: 18/641,935

(22) Filed: Apr. 22, 2024

(65) Prior Publication Data

US 2025/0328390 A1 Oct. 23, 2025

(51) Int. Cl.
*G06F 9/50* (2006.01)

(52) U.S. Cl.
CPC .......... *G06F 9/5038* (2013.01); *G06F 9/5033* (2013.01)

(58) Field of Classification Search
CPC .... G06F 9/5038; G06F 9/5033; G06F 9/4881; G06F 2209/548; G06F 9/542; G06F 9/546
See application file for complete search history.

(56) References Cited

U.S. PATENT DOCUMENTS

| | | | | |
|---|---|---|---|---|
| 2013/0024875 A1* | 1/2013 | Wang | G06F 9/542 719/318 |
| 2020/0089527 A1* | 3/2020 | Gavrilov | G06F 9/546 |
| 2024/0118739 A1* | 4/2024 | Gujjar | G06F 11/3409 |
| 2025/0156353 A1* | 5/2025 | Jin | G06F 13/26 |

OTHER PUBLICATIONS

U.S. Appl. No. 18/394,424, filed Dec. 22, 2023, entitled Prioritized Polling Techniques, Vladimir Shveidel, et al., (134766.01).

* cited by examiner

*Primary Examiner* — Sisley N Kim
(74) *Attorney, Agent, or Firm* — BainwoodHuang

(57) ABSTRACT

In at least one embodiment, processing can include: receiving I/O operations at a system; servicing the I/O operations, wherein servicing causes a plurality of events in connection with hardware components; and polling event queues associated with the hardware components, wherein each event queue indicates outstanding events of a corresponding one of the hardware components, wherein said polling includes: performing a first level polling cycle or interval, including calling first level pollers, wherein each of the first level pollers polls a corresponding event queue to determine whether the corresponding event queue has any outstanding events; and responsive to completing the first level polling cycle or interval, performing a second level polling cycle or interval, including calling a first set of one or more second level pollers based on one or more conditions.

20 Claims, 10 Drawing Sheets

MULTI-LEVEL POLLING TECHNIQUES

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving a plurality of I/O operations at a system; servicing the plurality of I/O operations, wherein said servicing the plurality of I/O operations causes a plurality of events in connection with a plurality of hardware components; and a plurality of event queues associated with the plurality of hardware components, wherein each of the plurality of event queues indicates outstanding events of a corresponding one of the plurality of hardware components, wherein said polling includes: performing a first level polling cycle or interval, including calling a first plurality of first level pollers, wherein each of the first level pollers of the first plurality polls a corresponding one of the plurality of event queues to determine whether said corresponding one event queue has any outstanding events; and responsive to completing the first level polling cycle or interval, performing a second level polling cycle or interval, including calling a first set of one or more of a second plurality of second level pollers based on one or more conditions.

In at least one embodiment, each of the first level pollers of the first plurality can check a first current value in a memory location indicating whether the corresponding one of the plurality event queues associated with said each first level poller includes any outstanding events. The first current value can be a Boolean indicator or flag having a value of yes or true if said corresponding one of the plurality of event queues has at least one outstanding event, and wherein otherwise said first current value is no or false. The one or more conditions can include a condition specifying that each of the second plurality of second level pollers called in the second level polling cycle or interval has at least one outstanding event in a respective one of the plurality of event queues polled by said each second level poller. For each of the plurality of event queues, one of the first plurality of first level pollers associated with said each event queue can determine, during the first level polling cycle or interval and using the respective first current value, whether said each event queue includes any outstanding events.

In at least one embodiment, the one or more conditions can include a condition specifying that if i) one of the second plurality of second level pollers has a corresponding priority above a priority threshold; and ii) a corresponding one of the plurality of event queues polled by said one second level poller has at least one outstanding event, then said one second level poller is included in the first set where said one second level poller is called in the second level polling cycle or interval. The one or more conditions can include a condition specifying that if i) one of the second plurality of second level pollers has a corresponding priority that is equal to or less than a priority threshold; and ii) a corresponding one of the plurality of event queues polled by said one second level poller has at least one outstanding event, then whether said one second level poller is called in the second level polling cycle is based, at least in part, on a corresponding polling frequency specified for said one second level poller. Processing can include determining, by a respective one of first plurality of first level pollers, whether the corresponding one of the plurality of event queues polled by said one second level poller has at least one outstanding event.

In at least one embodiment, the one or more conditions can include a condition specifying, for one of the second plurality of second level pollers, that if a corresponding one of the plurality of event queues polled by said one second level poller has a first quantity of outstanding events, where the first quantity exceeds a first average number of events in said corresponding one event queue by at least a first threshold amount, then said one second level poller is called in the second level polling cycle. The first quantity can exceed the first average number of events by at least said first threshold amount, the one second level poller can have an assigned priority that is less than a specified priority threshold, and the one or more conditions can include a second condition specifying that said one second level poller is called in the second level polling cycle independent of an assigned polling priority of said one second level poller.

In at least one embodiment, the plurality of hardware components can include a front-end (FE) hardware component that receives the plurality of I/Os from one or more hosts. A first of the second plurality of second level pollers can be configured to poll a first of the plurality of event queues associated with the FE hardware component for incoming I/Os received at the system. The plurality of hardware components can include a back-end (BE) hardware component including a first storage device. A first of the second plurality of second level pollers can be configured to poll a first of the plurality of event queues associated with the BE hardware component for completion of BE I/Os that access the first storage device. The plurality of hardware components can include a hardware accelerator component that performs any of: encryption, decryption, compression, and decompression. A first of the second plurality of second level pollers can be configured to poll a first of the plurality of event queues associated with the hardware accelerator component for completion of requests issued to the hardware accelerator component to perform one or more operations. The plurality of hardware components can include a first processing node and a second processing node. Processing can include the first processing node and the second processing node exchanging messages in connection with servicing a first of the plurality of I/O operations. A first of the second plurality of second level pollers can be configured to poll a first of the plurality of event queues associated with the first node, and wherein a second of the second plurality of second level pollers can be configured to poll a second of the plurality of event queues associated with the second node.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
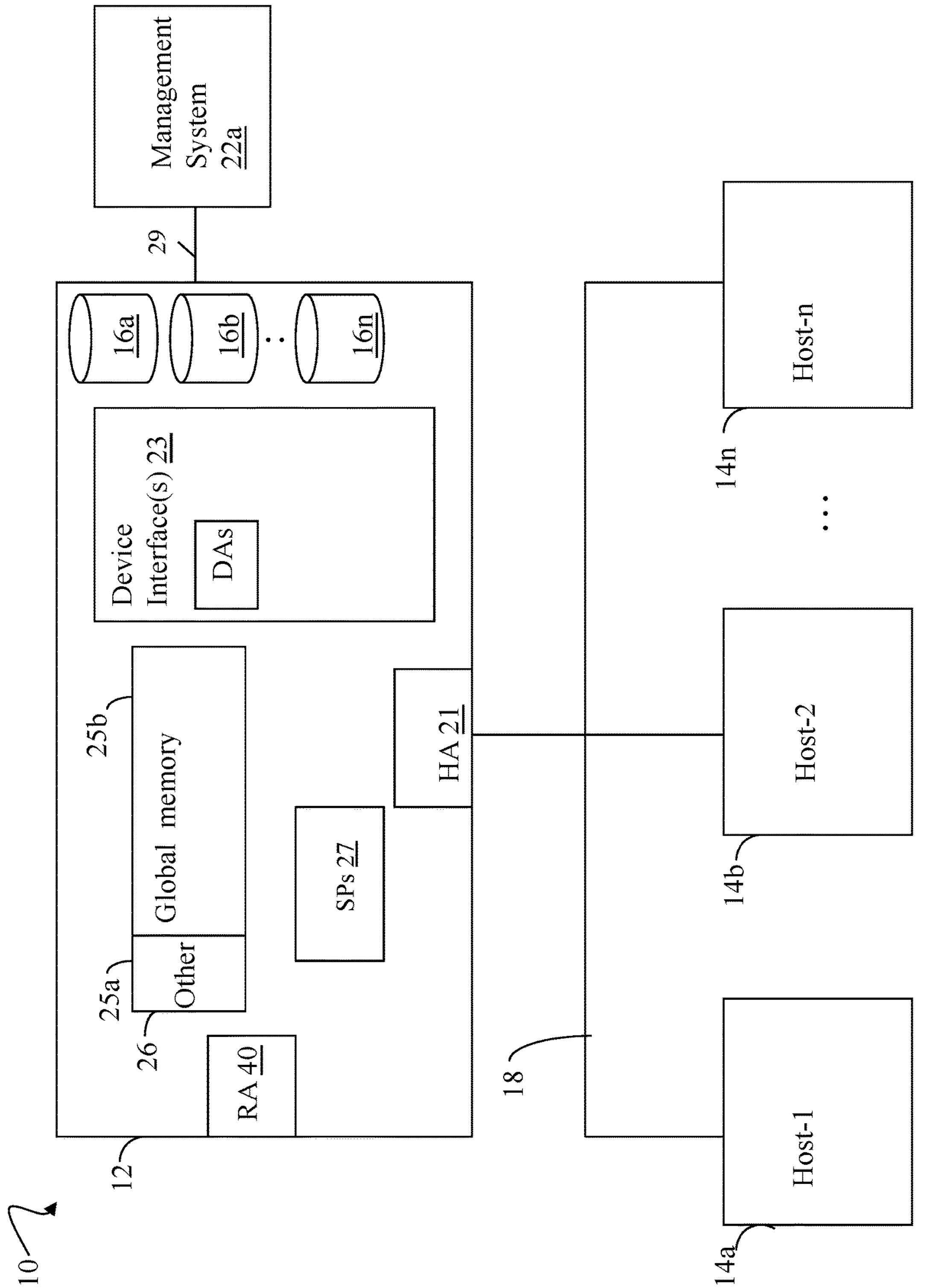
FIG. 1 is an example of components that may be included in a system in accordance with the techniques of the present disclosure.

In a storage system, I/O processing can be generally divided into two parts: CPU processing time and waiting time. CPU processing time can refer to the amount of time the CPU is used or the periods of time in which CPU processing cycles are consumed to process the I/O. For I/Os, CPU processing time can include the amount of CPU execution time expended processing an I/O, for example, when performing any of: hash digest computation in data deduplication processing, data compression, data decompression, parity calculation, and the like, with respect to content of the I/O operation. Waiting time can generally include the periods of time where an I/O operation was waiting on, or waiting for, something. In some systems, waiting time can be further divided into two parts: waiting time incurred while waiting for the system scheduler to grant the CPU for processing the I/O operation; and waiting time incurred while waiting on pollers. I/O processing can include initiating operations and waiting for completion of such operations. For example, an I/O can wait on the scheduler to schedule a thread servicing the I/O, for example, while the CPU is executing other code such as another thread servicing another I/O or other code of non-I/O workflows such as a background workflow. In at least one embodiment, a system can use pollers to poll various component interfaces for new event occurrences for which the I/O is waiting on or waiting for.

To achieve low latency, the storage system can execute the pollers at a high rate or frequency, optimally all the time in a continuous manner, in order to detect and process events as soon as possible. However, running the pollers consumes CPU processing cycles that can otherwise be used for servicing or processing I/Os. Constantly running the pollers can result in wasting CPU cycles especially, for example, when there are no new events or very few events to process or handle. Some applications or services can use a cyclic buffer to account for messages that are in flight or waiting to be sent. Some applications or services can also use a cyclic buffer to store incoming messages. Polling can be used, for example, to check the cyclic buffers to determine when outgoing messages have been sent and/or when new incoming messages are received. In each single polling cycle or interval, multiple such cyclic buffers can be traversed which can be very time consuming and consume an undesirable amount of CPU time especially in a case of a polling cycle when there are very few or no events to process. Additionally, even if the system is idle or in periods of low workload, running the pollers constantly or at a high frequency can also undesirably result in increased power consumption.

Thus one problem or undesirable consequence of having a high polling rate or frequency is the excessive consumption of CPU or processor resources. In particular, one contributing factor to the foregoing can be the undesirably high consumption of CPU or processor resources in polling cycles where there are very few or no events (e.g., empty cycle) to process. Even for highly optimized pollers, a polling cycle with few or no events can still have an undesirably high computational cost. In some instances pollers can be implemented as dedicated threads where there can be an additional CPU cost for performing context switching in order to execute the poller thread. In some instances pollers can be included in a special dedicated scheduling class where the entire class of pollers can be scheduled for execution. Scheduling all pollers of the class can reduce flexibility and prevent scheduling different pollers of the same class at different time intervals.

Accordingly, the techniques of the present disclosure can be used to reduce poller reaction time to recognize and process events, such as selected first events that have a higher relative priority than other second events. In at least one embodiment, the techniques of the present disclosure can be used to minimize and reduce the CPU cost associated with an empty polling cycle with no new events or more generally very few new events to be processed. In at least one embodiment, the selected first events having a higher priority can be associated with a latency sensitive workflow such as a latency sensitive I/O workflow of the data path or I/O path. In at least one embodiment, the techniques of the present disclosure can be used to reduce event waiting time associated with events of a latency sensitive I/O workflow.

In at least one embodiment, the techniques of the present disclosure can provide for reducing latency introduced by messages and polling affecting end-to-end I/O latency. Such messages in at least one embodiment can include messages sent between hardware (HW) components in a storage system, where the HW components can be two processing node of a storage system. In at least one embodiment, the messages can be sent or exchanged between HW components of the system in connection with servicing I/Os received at the storage system. In at least one embodiment, an interface can be used to communicate with a corresponding HW component. The storage system can perform polling using pollers that poll the HW component interfaces for new events. In at least one embodiment, the new events that are polled can include a new incoming message received by a HW component where the new incoming message is outstanding and needs to processed. The incoming message received by a first HW component can be an incoming work request from a second HW component instructing the first HW component to perform an operation or request. In response to the work request, the first HW component can perform the request operation; and can return to the second HW component a second message that is a reply to the work request. Thus in at least one embodiment, a HW component can receive messages that include incoming requests and also incoming replies received in response to previously sent requests to other HW components.

In at least one embodiment, the interface used to communicate with a HW component can include various communication queues. The particular queues of the interface and their use can vary with the particular HW component and protocols or standards used in an embodiment. In at least one embodiment, the communication queues of the interface can include one or more completion queues (CQs) and one or more message queues. A CQ can generally be associated with a message queue where the CQ can provide an indication, signal or notification regarding a new event. The one or more message queues can include a send queue (SQ) and/or an RQ indicating a receive queue or an incoming submission or message queue. In at least one embodiment, each CQ can be associated with an RQ. The SQ of a HW component's interface can be used to send outgoing messages from the corresponding HW component to another RQ of another HW component. The RQ of a HW component's interface can be used to store incoming messages received by the corresponding HW component such as from another SQ of another HW component. In at least one embodiment, the SQ can include multiple SQ entries each associated with a different outgoing message to be sent from the HW component.

For a CQ associated with an RQ of a HW component interface in at least one embodiment when exchanging messages between HW components, upon receiving an incoming message of the RQ, a corresponding completion indicator or signal can be made in an entry of the CQ indicating that the particular incoming message has been received. In at least one embodiment, the RQ can include multiple RQ entries each associated with an incoming message received by the HW component. In response to receiving from another HW component a new incoming message associated with an RQ entry, a completion signal or indicator can be made in a corresponding entry of the CQ as a signal or notification of a new event, where the new event is that the corresponding new incoming message has been received and needs to be processed.

In at least one embodiment where messages can be exchanged between HW components such as processing nodes of the storage system, a HW component can be characterized as an initiator by sending an outgoing message associated with an SQ of the HW component. In at least one embodiment, a HW component can be characterized as a target by receiving an incoming message that is associated with an RQ of the HW component. In at least one embodiment, a HW component can be configured as both an initiator and a target such that the HW component can both send messages to one or more other HW components, and receive messages from one or more other HW components. For example in at least one embodiment, a first HW component can send a first message to a second HW component where the first message is a first request instructing the second HW component to perform a first operation or command. The second HW component can perform the first operation and return a second message to the first HW component, where the second message is a first reply sent in response to the first request. Thus, the first HW component can be configured as, and can perform processing as, both an initiator with respect to the first message and a target with respect to the second message. Similarly, the second HW component can be configured as, and can performed processing as, both a target with respect to the first message and an initiator with respect to the second message. In such an embodiment where messages are exchanged between HW components such as between two nodes in a storage system, CQs of the HW component interfaces can be polled to service received messages that can include incoming work requests or incoming replies (e.g., sent from another HW component in response to other prior work requests). The CQ associated with an RQ of HW component such as a node can be polled and processed, for example, to process events signaling new incoming messages placed in the RQ, where such messages can include received work requests and/or replies to prior work request.

In at least one embodiment, a HW component can have an RQ and a corresponding CQ where the RQ holds received incoming requests or messages to be processed by the HW component. In at least one embodiment, the HW component can be, for example, a backend (BE) component such as one or more disk drives where the HW component interface including the RQ and CQ can be used in accessing the disk drives and performing BE read and/or write operations to the drives. In at least one embodiment, the disk drives can be solid state drives or SSDs accessed using the NVMe (Non-volatile Memory Express) protocol. In such an embodiment, RQ entries can include I/O requests such as read requests to read data from a disk drive and/or write requests to write data to a disk drive. Such I/O requests of the RQ can be processed by the disk drive. When a particular I/O request of an RQ entry has been completed or serviced by the disk drive, a corresponding CQ entry can be created to signal a new event indicating completion of the I/O request of the corresponding RQ entry. In this manner, the CQ entries can be polled and processed, for example, to provide requested read data of host I/Os and further service and acknowledge corresponding host I/Os. The CQ can more generally denote a event queue used to provide a signal or notification regarding new events to be processed.

In at least one embodiment, multiple levels of pollers can be used. In at least one embodiment, pollers can be partitioned into two levels or groupings. In at least one embodiment, a first level poller and a second level poller can be responsible for polling for new events of an event queue of a HW component. In at least one embodiment, the first level poller can check for a general indication of whether there are any new events (e.g., at least one new event) for the HW component on its corresponding event queue. If the first level poller determines there are one or more new events to be processed, then the second level poller can be executed. In at least one embodiment a CQ, that is more generally configured and operating as an event queue, can include indicators or signals of new events to be handled or processed. In at least one embodiment, a memory flag or indicator associated with the CQ can denote whether the CQ has any new events waiting to be handled or processed, where the first level poller can check the memory flag or indicator to determine whether there are any new events waiting to be processed in the corresponding CQ. The second level poller can be responsible for scanning the CQ for the new one or more events and handling processing of those events. In this manner, the second level poller does not waste CPU or processor time and can be invoked if there are outstanding or new events, as indicated by the corresponding first level poller. Using the first level poller allows for fast efficient initial recognition of whether there are any new events at all rather than simply scanning all entries of the CQ for any new event occurrences. Thus the first level poller can be quick and efficient and can be executed at a very high frequency such as relative to the polling frequency of a corresponding second level poller. In at least one embodiment, the first level pollers can be called at a first polling frequency that is more frequent that any second polling frequency of any second level poller.

In at least one embodiment, the first level pollers can be threads that are called inline from the scheduler to avoid incurring the CPU overhead that can be associated with context-switching. In at least one embodiment, inlining the first level pollers into the scheduler code can result in including the code of the first level pollers directly inline into the code of the scheduler to eliminate call-linkage overhead such as context switching. In such an embodiment where code of the first level pollers is included inline in the scheduler, the first lever pollers can execute in the context of the scheduler without performing a context switch.

In at least one embodiment, all first level pollers can be called to check corresponding CQs for any new events. Subsequently, second level pollers can be called for those CQs, as determined by the first level pollers, as having new events to be processed. Additionally in at least one embodiment, the particular second level pollers called at a particular point in time or second level polling cycle (following completion of the first level polling cycle by all first level pollers) can be based, at least in part, on priorities assigned to the second level pollers and/or target poller periods or polling frequencies assigned to the second level pollers.

In at least one embodiment, each of the second level pollers (and thus more generally each second level poller's corresponding HW component and interface) can be assigned a priority denoting a relative importance with respect to other remaining second level pollers. In at least one embodiment, the priority assigned to a particular second level poller can denote the influence or impact of any corresponding incurred wait time on critical work flows. In at least one embodiment, the priority assigned to a particular second level poller can denote the influence or impact the second level poller and this its associated HW component has, or is expected to have, on latency of critical flows such as I/O workflows. In at least one embodiment, the priority assigned to a particular second level poller can denote the influence or impact on latency of any corresponding wait time incurred by an event of the CQ associated with, and processed by, the second level controller.

In at least one embodiment, the priority assigned to a particular second level poller and thus also its HW component can be based, at least in part, on the impact the particular HW component has on latency of critical flows such as I/O workflows used in servicing I/Os. Thus in at least one embodiment, a first set of second level pollers (and thus corresponding HW components) associated with events that impact I/O latency, I/O latency sensitive workflows, and/or other critical or important workflows can be assigned a higher relative priority than other second level pollers and HW components that may generally have a lesser impact on such critical workflows and I/O latency. In at least one embodiment, a first set of second level pollers associated with events that impact I/O latency, I/O latency sensitive workflows and/or other critical or important workflows can be assigned a higher relative priority than a second set of second level pollers associated with events impacting non-critical workflows or workflows characterized as not I/O latency sensitive such as, for example, a background (BG) workflows. In at least one embodiment, a BG workflow can typically be performed during periods of low or idle workload (e.g., below a specified workload threshold such as where CPU utilization is below a threshold utilization).

In at least one embodiment, the first level pollers can run before each scheduler cycle such as prior to the CPU scheduler dequeuing the next task for execution by the CPU.

In at least one embodiment, a second level poller with outstanding events and a corresponding priority above a predefined priority threshold can be called immediately after, or in response to, completion of polling by all first level pollers. Thus in at least one embodiment, such second level pollers with corresponding priorities above the priority threshold can denote high priority second level pollers called or invoked after the first level polling has completed. In at least one embodiment, calling or invoking a second level poller can cause the second level polling to perform processing of a corresponding polling cycle. In at least one embodiment, a single polling cycle performed by the second level poller can include the second level poller traversing its one or more corresponding CQs for any new events to be processed. Thus in at least one embodiment at each occurrence of a polling cycle, the corresponding second level poller can traverse its one or more corresponding CQs for any new or outstanding events to be processed.

In at least one embodiment, a second level poller with outstanding events and a corresponding priority equal to, or below, the predefined priority threshold can be characterized as having a normal priority denoting a lower priority relative to second level pollers having a corresponding priority greater than the predefined priority threshold.

In at least one embodiment, a second level poller with outstanding events and a corresponding priority equal to, or below, the predefined priority threshold can be called (e.g., invoked, run or executed) after completion of the first level polling based on its corresponding target poller period such that the second level poller can be called every "target poller period" units of time. In this manner, the target poller period can denote a polling frequency or rate at which the corresponding second level poller performs a polling cycle. In at least one embodiment, a single polling cycle performed by the second level poller can include the second level poller traversing its one or more corresponding CQs for any events to be processed. Thus in at least one embodiment at each occurrence of a polling cycle, the corresponding second level poller can traverse its one or more corresponding CQs for any events to be processed. For example, for a second level poller POLL1 with outstanding events and a corresponding priority equal to, or below, the predefined priority threshold, POLL1 may have been called at a polling frequency of every 1 second such that only 1 second has elapsed since POLL1 was last invoked. POLL1 may have a target poller period denoting a polling frequency of every 1.5 seconds and may not be called at the current time. As such, processing can wait for another one or more first level polling cycles to complete for another 0.5 seconds to elapse before calling POLL1 to commence second level polling.

In at least one embodiment, each second level poller can be assigned a corresponding target poller period (e.g., polling frequency or rate) based, at least in part, on one or more metrics. For example, the target poller period for a second level poller can indicate to perform a polling cycle every X seconds, microseconds, milliseconds or other suitable unit of time, where X can generally be any suitable numeric value. In at least one embodiment, the one or more metrics can include any of: a number of events received in some predefined time duration (e.g., a new event rate such as a number of events per second or other suitable time unit); and a number of CPU cycles or an amount of CPU time consumed per event (e.g., to process each event). In at least one embodiment, the number of CPU cycles or amount of time consumed to process each event of a particular second level poller can be an average amount of CPU time consumed, or expected to be consumed. For example in at least one embodiment, the average amount of CPU time consumed to process an event of a CQ associated with a particular second level poller can be based on measured or observed CPU time consumed when processing events associated with the CQ of the particular second level poller (e.g., on average X seconds, microseconds, or milliseconds of CPU time is consumed to process a single event associated with the particular second level poller).

In at least one embodiment where the second level poller has a corresponding priority above the predefined priority threshold, the second level poller can be characterized as high priority such that the second level poller's corresponding target poller time period or polling frequency can be ignored for purposes of determining when to call the second level poller. Rather in at least one embodiment, the high priority second level poller with new or outstanding events can be called or invoked subsequent to all first level pollers completing their polling, where the second level poller is called or invoked independent of the second level poller's corresponding target poller time period or polling frequency.

In at least one embodiment, rather than have all first level pollers simply determine whether there are any new events in connection with corresponding CQs, each of one or more of the first level pollers can utilize a count or quantity denoting a number of outstanding or new events in a particular corresponding CQ. In at least one embodiment, a count or quantity, N_OUTSTANDING, denoting the current number of outstanding or new events in a particular CQ can be maintained and used by a first level poller. Additionally, AVE denoting an average number of events in the CQ can also be maintained and used by the first level poller. The first level poller can check the value of the count, N_OUTSTANDING, for the CQ. In at least one embodiment, if N_OUTSTANDING is greater than the AVE for the CQ by a predefined threshold amount, the second level poller associated with the CQ can be executed immediately (after all first level polling completes) even if its priority is equal to or less than the predefined priority threshold. The foregoing can be done in efforts to reduce latency. For example, while a single I/O corresponding to a single event of the CQ can wait and incur a negligible latency impact, if there are 100 I/Os corresponding to 100 events of the CQ, the impact on latency can be much more significant. Put another way if there are 100 I/Os or events denoting a burst of high I/O activity greater than N_OUTSTANDING, then processing can be performed to process or handle the 100 events corresponding to the burst of I/Os.

In at least one embodiment, communication queues of an interface of a HW component can be partitioned and maintained by multiple first level pollers and multiple second level pollers. In at least one embodiment, high priority queues associated with critical or latency sensitive workflows can be maintained using a first set of critical pollers including one or more first level pollers and one or more second level pollers; and lower priority queues associated with non-critical or non-latency sensitive workflows can be maintained using a second set of non-critical pollers including one or more first level pollers and one or more second level pollers.

The techniques of the present disclosure can be performed using any suitable protocol and standard that can vary with embodiment.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14*a*-14*n* through the communication medium 18. In this embodiment of the SAN 10, the n hosts 14*a*-14*n* access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14*a*-14*n* access and communicate with the data storage system 12, and also communicate with other components included in the SAN 10.

Each of the host systems 14*a*-14*n* and the data storage system 12 included in the SAN 10 are connected to the communication medium 18 by any one of a variety of connections as provided and supported in accordance with the type of communication medium 18. The processors included in the host systems 14*a*-14*n* and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14*a*-14*n* and the data storage system 12 can all be located at the same physical site, or, alternatively, be located in different physical locations. The communication medium 18 used for communication between the host systems 14*a*-14*n* and the data storage system 12 of the SAN 10 can use a variety of different communication protocols such as block-based protocols (e.g., SCSI, FC, ISCSI), file system-based protocols (e.g., NFS or network file server), and the like. Some or all of the connections by which the hosts 14*a*-14*n* and the data storage system 12 are connected to the communication medium 18 can pass through other communication devices, such as switching equipment, a phone line, a repeater, a multiplexer or even a satellite.

Each of the host systems 14*a*-14*n* can perform data operations. In the embodiment of the FIG. 1, any one of the host computers 14*a*-14*n* issues a data request to the data storage system 12 to perform a data operation. For example, an application executing on one of the host computers 14*a*-14*n* performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16*a*-16*n*. The data storage devices 16*a*-16*n* include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14*a-n*. In at least one embodiment, the data storage array or system includes one or more RAs used, for example, to facilitate communications between data storage arrays. The data storage array also includes one or more device interfaces 23 for facilitating data transfers to/from the data storage devices 16*a*-16*n*. The data storage device interfaces 23 include device interface modules, for example, one or more disk adapters (DAs) (e.g., disk controllers) for interfacing with the flash drives or other physical storage devices (e.g., PDS 16*a-n*). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25*b* is used to facilitate data transfers and other communications between the device interfaces, the HAs and/or the RAs in a data storage array. In one embodiment, the device interfaces 23 performs data operations using a system cache included in the global memory 25*b*, for example, when communicating with other device interfaces and other components of the data storage array. The other portion 25*a* is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14*a*-14*n* provide data and access control information through channels to the storage systems 12, and the storage systems 12 also provide data to the host systems 14*a-n* also through the channels. The host systems 14*a-n* do not address the drives or devices 16*a*-16*n* of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22*a* used to manage and monitor the data storage system 12. In one embodiment, the management system 22*a* is a computer system which includes data storage system management software or application that executes in a web browser. A data storage system manager can, for example, view information about a current data storage configuration such as LUNs, storage pools, and the like, on a user interface (UI) in a display device of the management system 22*a*. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16*a*-16*n*. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22*a* to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22*a* to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2:
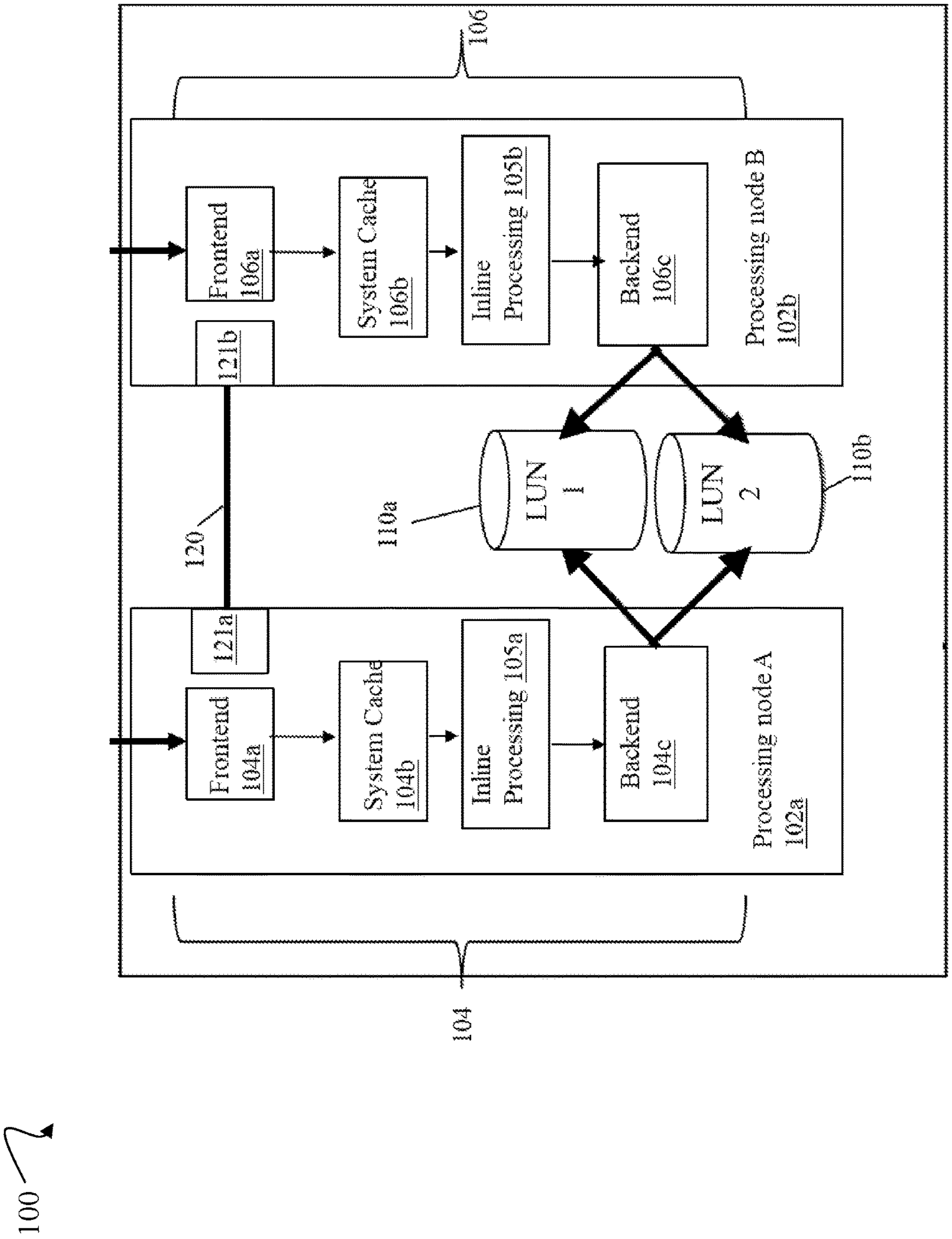
FIG. 2 is an example illustrating the I/O path or data path in connection with processing data in at least one embodiment in accordance with the techniques of the present disclosure.

With reference to the FIG. 2, shown is an example 100 illustrating components that can be included in the data path in at least one existing data storage system in accordance with the techniques of the present disclosure. The example 100 includes two processing nodes A 102*a* and B 102*b* and the associated software stacks 104, 106 of the data path, where I/O requests can be received by either processing node 102*a* or 102*b*. In the example 200, the data path 104 of processing node A 102*a* includes: the frontend (FE) component 104*a* (e.g., an FA or front end adapter) that translates the protocol-specific request into a storage system-specific request; a system cache layer 104*b* where data is temporarily stored; an inline processing layer 105*a*; and a backend (BE) component 104*c* that facilitates movement of the data between the system cache and non-volatile physical storage (e.g., back end physical non-volatile storage devices or PDs accessed by BE components such as DAs as described herein). During movement of data in and out of the system cache layer 104*b* (e.g., such as in connection with read data from, and writing data to, physical storage 110*a*, 110*b*), inline processing can be performed by layer 105*a*. Such inline processing operations of 105*a* can be optionally performed and can include any one of more data processing operations in connection with data that is flushed from system cache layer 104*b* to the back-end non-volatile physical storage 110*a*, 110*b*, as well as when retrieving data from the back-end non-volatile physical storage 110*a*, 110*b* to be stored in the system cache layer 104*b*. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102*b* has its own FE component 106*a*, system cache layer 106*b*, inline processing layer 105*b*, and BE component 106*c* that are respectively similar to the components 104*a*, 104*b*, 105*a* and 104*c*. The elements 110*a*, 110*b* denote the non-volatile BE physical storage provisioned from PDs for the LUNs, whereby an I/O can be directed to a location or logical address of a LUN and where data can be read from, or written to, the logical address. The LUNs 110*a*, 110*b* are examples of storage objects representing logical storage entities included in an existing data storage system configuration. Since, in this example, writes, or more generally I/Os, directed to the LUNs 110*a*, 110*b* can be received for processing by either of the nodes 102*a* and 102*b*, the example 100 illustrates what can also be referred to as an active-active configuration.

In connection with a write operation received from a host and processed by the processing node A 102*a*, the write data can be written to the system cache 104*b*, marked as write pending (WP) denoting it needs to be written to the physical storage 110*a*, 110*b* and, at a later point in time, the write data can be destaged or flushed from the system cache to the physical storage 110*a*, 110*b* by the BE component 104*c*. The write request can be considered complete once the write data has been stored in the system cache whereby an acknowledgement regarding the completion can be returned to the host (e.g., by component the 104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2 is an internal network interconnect 120 between the nodes 102*a*, 102*b*. In at least one embodiment, the interconnect 120 can be used for internode communication between the nodes 102*a*, 102*b*. In at least one embodiment, the interconnect 120 can be a network connection between a network interface 121*a* of node A and a network interface 121*b* of node B. The nodes 102*a-b* can communicate with one another over their respective network interfaces 121*a-b*. Generally, the network interfaces 121*a-b* can each include one or more network cards or adapters and/or other suitable components configured to facilitate communications between the nodes 102*a-b* over network interconnect 120.

In at least one embodiment, the network interfaces 121*a-b* can each include one or more suitable cards or adapters that support one or more of the following for communication between the nodes 102*a-b*: RDMA (Remote Direct Memory Access) over InfiniBand standard, RMDA over converged Ethernet (RoCE) standard, and/or RDMA over IP (e.g., Internet Wide-Area RDMA protocol or iWARP) standard. The network interfaces 121*a-b* can also generally denote communication interfaces that can include hardware, firmware, and/or software that facilitates communication between the nodes 102*a-b*.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102*a-b* in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of processing nodes can be configured in an active-active configuration as described elsewhere herein, such as in connection with FIG. 2, where each node of the pair has access to the same PDs providing BE storage for high availability. With the active-active configuration of each pair of nodes, both nodes of the pair can receive and process I/O operations or commands, and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of processing nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs. In at least one embodiment, a portion of each node's local volatile memory can also be used for caching information, such as blocks or pages of user data and metadata. For example, such node-local cached pages of user data and metadata can be used in connection with servicing reads for such user data and metadata.

The one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In at least one embodiment, a metadata (MD) structure of MD pages of mapping information can be used in accordance with the techniques herein. The mapping information can be used, for example, to map a logical address (e.g., user or storage client logical address), such as a LUN and an LBA or offset, to its corresponding storage location, such as a physical storage location on BE non-volatile PDs of the system. The mapping information can be used to map the logical address to the physical storage location containing the content or data stored at the logical address. In at least one embodiment, the mapping information includes a MD structure that is a hierarchical structure of multiple layers of MD pages or blocks.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node or MD top page), a single mid-level (MID node or MD mid page) and a bottom level of leaf nodes (LEAF nodes or MD leaf pages), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. The tree structure of MD pages, corresponding to the mapping structure in at least one embodiment, can include only 3 levels where each node in the tree can have at most 3 child nodes. Generally, an embodiment can use any suitable structure or arrangement of MD pages comprising the mapping information. In at least one embodiment, mapping information of a chain of MD pages can be used to map a logical address LA, such as an LA of a LUN, volume, or logical device, to a corresponding physical address or location PA on BE non-volatile storage, where PA contains the content C1 stored at LA. In at least one embodiment, the chain of MD pages can include MD pages of the various levels of the mapping structure, such as MD top mid and leaf pages. A MD page at one level in the hierarchy can reference other MD pages at a different level in the hierarchy. For example, the chain of MD pages of mapping information mapping LA to PA can include a MD top page that references a MD mid page, where the MD mid page references a MD leaf page.

Before discussing further details regarding multi-level pollers in embodiments in accordance with the present disclosure, an initial discussion is first provided regarding examples of various HW components and interfaces that can be used with the multi-level pollers.

As a first example of HW components that can use the techniques of the present disclosure, consider messages that are exchanged between two HW components such as two processing nodes of a storage system. Subsequently additional non-limiting exemplary uses with other HW components are provided. For example, the HW component can be any of: an FE component such as any of FEs 104*a*, 106*a* that receives I/O requests such as from hosts or other external storage clients; a processing node of the storage system such as any of processing nodes 102*a-b*; any CPU or processor; a BE component such as any of BE 104*c*, 106*c*, where the BE component can be, for example, a disk controller and/or disk drives; a HW accelerator to offload specialized functions and reserve compute cores for general-purpose tasks, where the HW accelerator can be, for example, a HW component that performs compression and decompression of data and/or encryption and decryption of data.

In some contexts herein, a processing node which receives an I/O operation can be referred to as the initiator node with respect to that particular I/O operation. In some contexts herein, a processing node can also be referred to as an initiator with respect to initiating sending a message or request to a peer node, where the peer node can be referred to as a target with respect to the message or request. In response to receiving the message or request, the target node can perform processing to service the request or received message, and then send a reply, response or return message to the initiator.

More generally in some contexts herein, a first hardware (HW) component, such as a first processing node or other HW device, can be an initiator with respect to a request or message that is sent to a second HW component, such as a second processing node or other HW device. The second HW component can generally be referred to as a target with respect to the message or request sent from the first HW component that is the initiator that sends the message or request.

In some scenarios, a single HW component can be configured as both an initiator and a target so that the single HW component can both act as an initiator that sends messages or requests to one or more other HW components, and a target that receives messages or requests from one or more other HW components. For example, the first HW component can be an initiator and send a first message to the second HW component that is the target of the first message. In response to the first message, the second HW component can send a second message to the first HW component. With respect to the second message, the second HW component can be configured as the initiator and the first HW component can be configured as the target. For example, the first message can be a first request where the first HW component requests that the second HW component perform a service or processing. For example, the second message can be a reply to the first request where the second message can vary in accordance with the particular service or processing performed. In at least one embodiment, the HW component configured as an initiator and/or target can be any suitable HW component.

Figure 3:
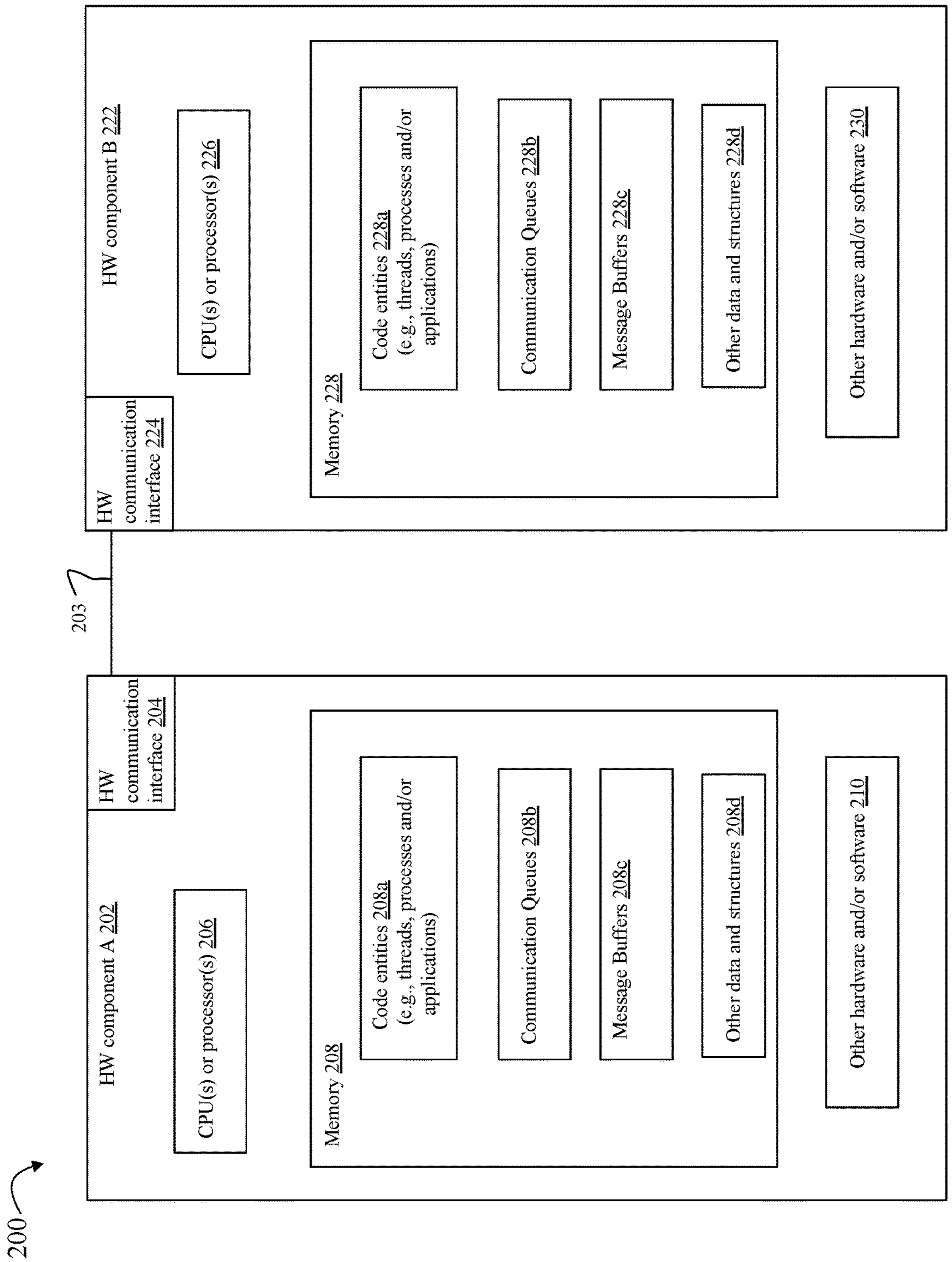
FIGS. 3, 4, 5, 6, 7, 8 and 9 are examples illustrating structures and components that can be included in embodiments in accordance with the techniques of the present disclosure.

Referring to FIG. 3, shown is an example 200 of components that can be included in at least one embodiment in accordance with the techniques of the present disclosure.

The example 200 illustrates two HW components 202, 222 that can be included in a system such as a storage system using the techniques of the present disclosure. Although only 2 HW components 202, 222 are shown in the example 200, generally the system can include any suitable number of HW components using the techniques of the present disclosure. In at least one embodiment, each of the HW components 202, 222 can be a processing node such as, for example, described in connection with FIG. 2.

The HW component 202 can include HW communication interface 204, CPUs or processors 206, memory 208 and other hardware and/or software 210. The HW communication interface 204 can generally denote hardware such as circuitry used to facilitate communications between the HW components 202, 222. The HW communication interface 204 can vary with HW component and embodiment. For example, in at least one embodiment the HW communication interface 204 can be a NIC. The HW communication interface can include, for example, one or more Ethernet cards, cellular modems, Fibre Channel (FC) adapters, Infiniband (IB) adapters, wireless networking adapters (e.g., Wi-Fi) and other devices or circuitry for connecting the two HW components 202, 222. The CPUs or processors 206 can include CPU processing resources of the HW component 202. In at least one embodiment, the CPU or processor resources of 206 can include multi-core processors such that 206 can include multiple processing cores.

The memory 208 can include both volatile and non-volatile memory where the various elements of memory 208 can be stored in volatile and/or non-volatile memory as may be suitable depending on usage. The memory 208 can include code entities **208*a*, communication queues 208, message buffers 208*c*, and other data, structures, and the like 208*d*. Thus element 208*d* can generally denote any other data or information that can be used by and/or stored in a suitable form of memory 208 of the HW component 202**.

In at least one embodiment, the code entities **208*a*, communication queues 208*b* and message buffers 208*c*** can be stored in a suitable non-volatile or persistent memory.

The code entities **208*a* can include threads, processes and/or applications. For example, the code entities 208*a* can include one or more first level pollers and one or more second level pollers used in connection with polling one or more corresponding CQs. The communication queues 208*b*** can generally include one or more message queues and one or more CQs. Each of the message queues can be either an SQ or an RQ. In at least one embodiment, each RQ can be associated with a corresponding CQ. Consistent with other discussion herein in at least one embodiment, each CQ can include entries used to signal new or outstanding events of a corresponding message queue (e.g., where the corresponding message queue either an SQ or an RQ).

The HW component 222 can include HW communication interface 224, CPUs or processors 226, memory 228 and other hardware and/or software 230. The elements 222, 224, 226, 228, **228*a-d* and 230 of HW component 222 can be respectively analogous to elements 202, 204, 206, 208, 208*a-d* and 210 of HW component 202** as discussed above.

The HW components 202, 222 can communicate over a connection 203, where 203 can be any suitable communication connection in accordance with the particular HW communication interfaces 204, 224. For example, if the HW communication interfaces 204, 224 each denote a NIC, then 224 can denote a suitable network connection.

Figure 4:
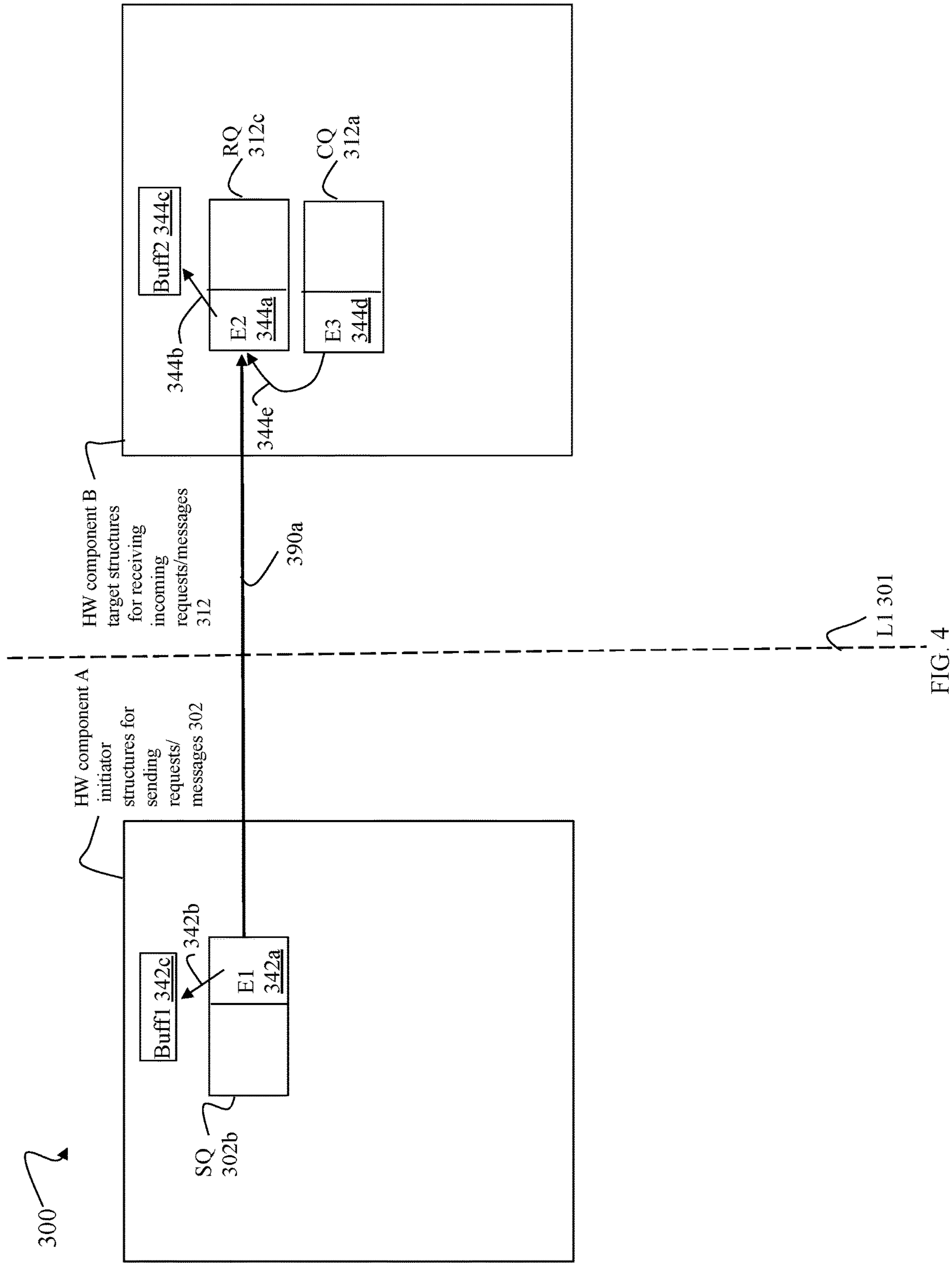

Referring to FIG. 4, shown is an example 300 providing further detail regarding the use of communication queues of HW component interfaces in at least one embodiment.

The example 300 illustrates structures of HW component A 302 configured as an initiator for sending messages to the HW component B. Additionally, the example 300 illustrates structures of HW component 312 configured as a target for receiving messages. Elements to the left of the line L1 301 can be included in HW component A and elements to the right of the line L1 301 can be included in HW component B.

HW component A 302 can include an SQ **302*b* with SQ entry 342*a* associated with a corresponding buffer 342*c*. In at least one embodiment, the SQ entry 342*a* can include a descriptor with information including a pointer to, or address of (342*b*), the buffer 342*c*. The buffer 342*c* can include the message to be sent (390*a*) from HW component A to HW component B. The message sent (390*a*) from HW component A can be received at HW component B where a corresponding RQ entry 344*a* can be updated and the received message can be stored in the buffer buff 344*c*. In at least one embodiment, the RQ entry 344*a* and buffer 344*c* may have been allocated and setup prior to receiving the message from HW component A that is stored in the buffer 344*c*. Similar to the SQ entry 342*a*, the RQ entry 344*a* can include a descriptor that further includes a pointer to, or address of (344*b*) the buffer 344*c*. Once the message has been received on HW component B and stored in 344*c* that is associated with the RQ entry 344*a*, a corresponding CQ entry 344*d* of the CQ 312*a* can be used to signal or notify a new event corresponding to the received incoming message stored in the buffer 344*c*. In at least one embodiment, the CQ entry 344*d* can point to or reference (344*c*) the corresponding RQ entry 344*a* associated with the buffer 344*c*** containing the received new message to be processed.

In connection with the arrangement of FIG. 4, polling can be performed to poll the CQ **312*a* for notification regarding new events corresponding to new received messages of the RQ 312*c***.

Although the example 300 illustrates HW component A configured as an initiator and HW component B configured as a target, more generally HW component A and/or B can be configured as both an initiator and target with respect to messages exchanges therebetween. For example, the message sent (**390*a*) from HW component A to HW component B may be a first message that is a work request instructing node B to perform an operation. In response to receiving the first message, HW component B can performed the operation and then send to HW component A a second message that is a reply or response to the work request/first message. In connection with the second message, now HW component B can be the initiator and HW component A can be the target. As such, HW component A can be further configured to have its own instance of an RQ and CQ similar to the elements 312*c*, 312*a*. Additionally, HW component B can be further configured to have its own local instance of an SQ similar to element 302*b***.

In at least one embodiment where HW component A denotes processing node A of the storage system and HW component B denotes processing node B of the storage system, the messages exchanged can include remote procedure call (RPC) request and reply messages. In the example 300, HW component or node B as the target can poll CQ **312*a*** for notifications regarding new incoming messages or requests that are new events. In response to receiving the first work request from node A, node B can perform processing and send a second message to node A that is a reply or response to the first work request. For example, the second message or reply can include requested information or content obtained by node B. Thus node A, when also configured as a target, can also poll for new incoming messages from node B in node A's CQ (not shown) that are new events, where the incoming messages from node B can be responses or replies to corresponding messages or work requests previously sent from node A to node B.

In at least one embodiment, the RPC request can be sent from a first processing node to a second processing node requesting that the second node perform address resolution processing for a specified logical address. Consistent with discussion herein in at least one embodiment, such address resolution processing can include traversing the mapping of the chain of MD pages to determine the physical address or location of content stored at the logical address. Thus in at least one embodiment, the RPC reply or response can be the physical address or location of the content, or an indirect pointer to the content as stored in the physical address or location. In at least one embodiment, the foregoing address resolution processing and RPC request response exchange between two nodes can be performed in connection with servicing an I/O operation directed to the logical address. The I/O operation can be, for example, a read I/O to read data from the logical address. The read I/O can result in a read cache miss where the read data is not stored in cache and is then read from BE non-volatile storage and returned to the host or other client that sent the read I/O. Part of processing to service the read cache miss of the read I/O workflow can include performing, for the read I/O logical address, the foregoing address resolution processing and RPC request response exchange between two nodes.

In one embodiment as illustrated in FIG. 4, incoming messages can be included in RQ associated with a CQ where a new incoming message can be associated with an RQ entry and stored in a memory buffer location identified by the RQ entry. Additionally, a CQ entry can reference or point to the corresponding RQ entry of the new message, where the CQ entry can denote a new or outstanding event signaling receipt of the new message to be processed.

Figure 5:
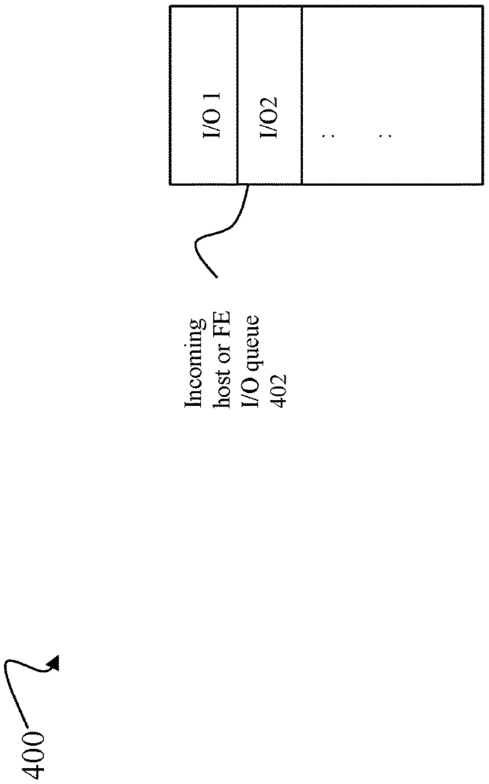

In at least one embodiment, the CQ entry, such as 344*d*, can identify the corresponding RQ/submission queue entry 344*a* using any suitable means such as, for example, having the CQ entry 344*d* point to or reference the corresponding RQ/submission queue entry such as by having the CQ entry 344*d* include the pointer to or address of (344*e*) the corresponding RQ/submission queue entry 344*a* or having the CQ entry 344*d* include a unique identifier of the corresponding RQ/submission queue entry 344*a*. Referring to FIG. 5, shown is an example 400 of an incoming host I/O queue that can be included in an interface of a FE component in at least one embodiment in accordance with the techniques of the present disclosure.

The example 400 includes an incoming host I/O queue 402 where I/Os, as received by a FE port of the storage system from hosts, can be placed in the queue 402. In at least one embodiment, the queue 402 can be polled to check for any new incoming host I/Os that are awaiting processing or servicing. Thus a new or outstanding event to be processed can be new or outstanding I/O requests received from hosts. In at least one embodiment, new I/O requests received from external hosts by the FE component can be placed in the queue 402. Initially, I/Os arrive at the storage system and can be placed in the queue 402, where the I/O waits to be selected for servicing or processing. While the I/Os wait in the queue 402, servicing or processing of the I/Os has not yet begun. Polling can be performed to check the queue 402 for new or outstanding I/Os that can be selected for processing or servicing. In such an embodiment, the entries of the queue 402 can be characterized as new events to be processed.

Figure 6:
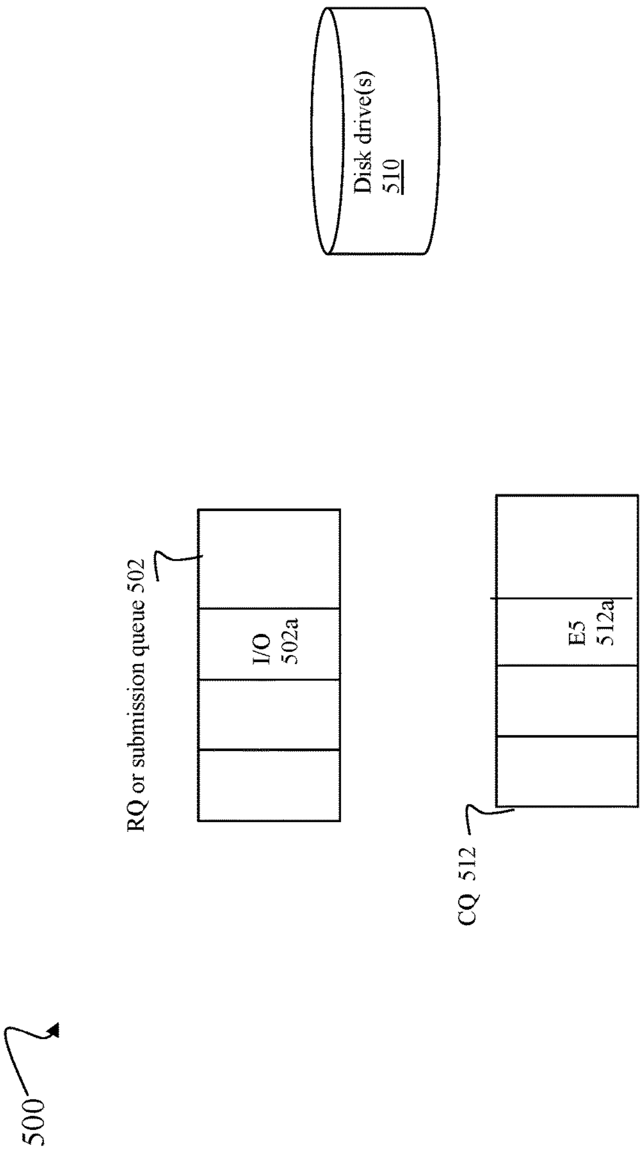

Referring to FIG. 6, shown is an example of 500 of a BE component and communication queues of the BE component interface in at least one embodiment.

The example 500 includes the RQ 502, the disk drive 510 and the CQ 512. In at least one embodiment, the disk drive 510 can be a BE non-volatile drive that is an SSD operating in accordance with the NVMe protocol. The RQ 502 can be a receive queue or a submission queue including I/Os issued to the drive 510. The I/Os can include read operations to read content from the drive 510 and/or write operations that write content to the drive 510. The CQ 512 can be used to signal when the drive 510 has completed processing incoming messages or requests of the RQ 502. Polling can be performed to check the entries of the CQ 512 for new or outstanding CQ entries signaling completion of corresponding RQ entries of the RQ 502.

In at least one embodiment, the RQ entry 502*a* can be a work request or BE I/O to read content from, or write content to, the drive. Thus the work request of the RQ entry 502*a* can be a request to perform processing to service an I/O received from a host by the storage system. For example, the RQ entry 502*a* can be a request to read content C1 from a particular physical address or location PAI of the drive 510. In at least one embodiment, the RQ entry 502*a* can include a descriptor that includes: the type of I/O operation or request such as a read or write; a pointer to or address of a memory buffer; and a physical address or location denoting a target location of the I/O operation or request. If the I/O operation of 502*a* is a read, then the memory buffer of the descriptor of 502*a* can denote a storage location where the drive returns the requested read data. If the I/O operation of 502*a* is a write, then the memory buffer of the descriptor of 502*a* can denote a storage location of the data to be written out to the drive.

If the I/O operation or request of the entry 502*a* is a read, the drive 510 can service the request of the RQ entry 502*a* by i) reading the descriptor of 502*a*; ii) using the physical address from the descriptor to retrieve the requested read data from the drive; and iii) storing the read data in the memory buffer identified by the descriptor. If the I/O operation or request of the entry 502*a* is a request to write content C1, the drive 510 can service the request by i) reading the descriptor of 502*a*; ii) retrieving the write content C1 from the memory buffer identified in the descriptor; and iii) storing the write content C1 (as obtained from the memory buffer identified by the descriptor) at the physical address or location on the drive, where the physical address or location is identified in the descriptor.

Once the drive has completed servicing the RQ entry 502*a*, the drive 510 can signal completion by placing a corresponding entry 512*a* in the CQ 512 associated with the RQ 502. In at least one embodiment, the CQ entry 512*a* can include an identifier or other corresponding information used to identify the particular RQ entry, incoming message or incoming request that was processed and completed. For example, the RQ entry 502*a* can be a work request to read content from, or write content to, the drive. Thus the work request of the RQ entry 502*a* can be included in an I/O workflow to perform processing to service an I/O received from a host by the storage system. The latency of the I/O can be based, at least in part, on the amount of time it takes the poller to recognize, identify and process the corresponding CQ entry 512*a* signaling completion of the work request of the RQ entry 502*a*. If the poller can quickly recognize, identify and process the CQ entry 512*a* signaling completion of the work request of the RQ entry 502*a*, the I/O being serviced can be completed and acknowledged quickly. In contrast, if the poller takes added time to recognize, identify and process the CQ entry 512*a* signaling completion of the work request of the RQ entry 502*a*, the I/O being serviced can take longer to complete and acknowledge and will have a longer latency.

With the BE component interface for accessing the BE PDs, new or outstanding events can be the CQ entries of the CQ 512 corresponding to completed work requests of the RQ 502 for reading data from and writing data to BE PDs.

In at least one embodiment, there can be one set of communication queues for each drive, where each set of queues can include an RQ/submission queue and a corresponding CQ. In at least one embodiment, there can be one set of queues for one or more specified BE components such as one or more specified drives, where each set of queues can include an RQ/submission queue and a corresponding CQ. In this case where a queue can include entries relevant to multiple drives, the queue entries can further identify the particular drive.

Figure 7:
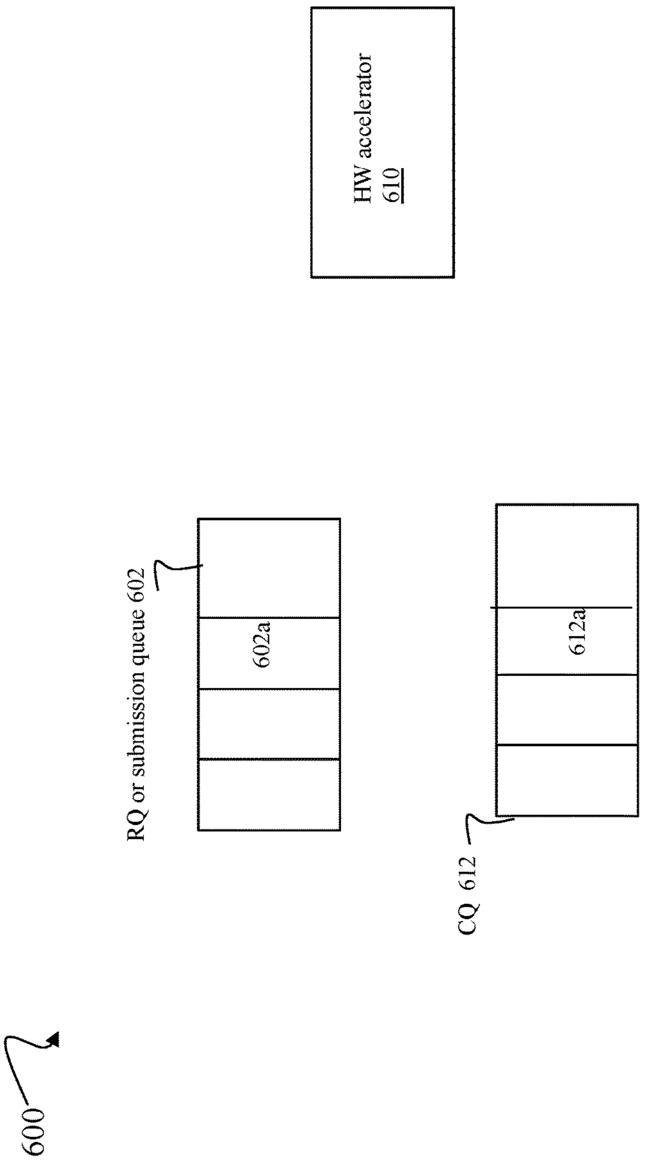

Referring to FIG. 7, shown is an example of 600 of a HW accelerator and communication queues of the HW accelerator interface in at least one embodiment.

The example 600 includes the RQ 602, the HW accelerator 610 and the CQ 612. In at least one embodiment, the HW accelerator 610 can be a component that performs various operations, such as compression, decompression, encryption and/or decryption, on provided content. Such operations can be performed as part of I/O workflow processing to service a host I/O operation. For example a request can be issued to the HW accelerator to decrypt or decompress content read from BE non-volatile storage where the decompressed or decrypted data is to be returned in response to a host read I/O operation.

The RQ 602 can be a receive queue or a submission queue including work requests issued to the HW accelerator 610. The CQ 612 can be used to signal when the HW accelerator has completed processing incoming messages or requests of the RQ 602. Polling can be performed to check the entries of the CQ 612 for new or outstanding CQ entries signaling completion of corresponding RQ entries of the RQ 602.

The RQ 602 includes entries, such as 602*a*, that are work requests to perform an offload operation such as compression, decompression, encryption and/or decryption that can be performed by the HW accelerator 610. In at least one embodiment with the HW accelerator 610, an RQ queue entry such as 602*a* can include a descriptor that: i) identifies an input buffer of the input data provided to the accelerator; ii) identifies the one or more operations to perform in the input data; and ii) identifies an output buffer where the HW accelerator can write the output data generated as a result of performing the requested one or more operations on the input data. Once the HW accelerator 610 has completed processing for an RQ entry such as 602*a*, a corresponding CQ entry, such as 612*a*, can signal or notify regarding completion pf the corresponding work request of the RQ entry 602*a*.

With the HW accelerator 610, new or outstanding events can be the CQ entries of the CQ 612 corresponding to completed work requests for performing such offloaded operations for data provided to the HW accelerator. Each CQ entry, such as 612*a*, can denote a new or outstanding event signaling completion of a corresponding RQ queue entry, such as 602*a*.

In at least one embodiment, the CQ entry can identify the corresponding RQ/submission queue entry using any suitable means such as, for example, having the CQ entry point to or reference the corresponding RQ/submission queue entry such as by having the CQ entry include a pointer to or address of the corresponding RQ/submission queue entry or having the CQ entry include a unique identifier of the corresponding RQ/submission queue entry.

The RQ entry 602*a* can be a work request for the HW accelerator to perform an offloaded operation such as encryption, decryption, compression or decompression. Thus the work request of the RQ entry 602*a* can be included in an I/O workflow to perform processing to service an I/O received from a host by the storage system. The latency of the I/O can be based, at least in part, on the amount of time it takes the poller to recognize, identify and process the corresponding CQ entry 612*a* signaling completion of the work request of the RQ entry 602*a*. If the poller can quickly recognize, identify and process the CQ entry 612*a* signaling completion of the work request of the RQ entry 602*a*, the I/O being serviced can be completed and acknowledged quickly. In contrast, if the poller takes added time to recognize, identify and process the CQ entry 612*a* signaling completion of the work request of the RQ entry 602*a*, the I/O being serviced can take longer to complete and acknowledge and will have a longer latency.

In connection with the various examples in FIGS. 4, 5, 6 and 7 of HW components and associated interfaces, various communication queues can be generalized and characterized as event queues used to signal or notify a new event regarding a message or request to be processed.

For example, reference is made back to FIG. 4 regarding the example of exchanging messages between two HW components such as nodes of a storage system. In the example 300, the CQ 312*a* includes entries used to signal or provide notification of a new event regarding an incoming message received by a node characterized as a target that receives the incoming message. Thus the CQ 312*a* can be more generally referred to as an event queue including entries that each provide notification to a first node or first HW component of a new event that is receipt of a new or outstanding message from another node or HW component.

Reference is made back to FIG. 5 regarding the example of an incoming host I/O or FE queue included in the communication queues of the FE component interface. In the example 400, the queue 402 includes entries used to signal or notify a new event regarding incoming host I/Os received by the storage system. Thus the queue 402 can be more generally referred to as an event queue including entries that each provide notification of a new event that is receipt of a new or outstanding host I/O.

Reference is made back to FIG. 6 regarding the example of a BE component having an associated BE component interface used to access drives providing BE non-volatile storage. In the example 500, the CQ 512 includes entries used to signal or provide notification of a new event regarding completion of a corresponding BE I/O issued to a drive 510. Thus the CQ 512 can be more generally referred to as an event queue including entries that each provide notification of a new event regarding completion of a BE I/O request.

Reference is made back to FIG. 7 regarding the example of a HW accelerator having an associated interface used to communicate with the HW accelerator. In the example 600, the CQ 612 includes entries used to signal or provide notification of a new event regarding completion of a corresponding HW accelerator work request of the RQ 602 issued to the HW accelerator 610. Thus the CQ 612 can be more generally referred to as an event queue including entries that each provide notification of a new event regarding completion of a HW accelerator request.

What will now described is further detail regarding use of multiple levels of pollers in accordance with the techniques of the present disclosure. In at least one embodiment, such multiple level pollers can be used in connection with any one or more of the HW components and interfaces of FIGS. 3, 4, 5, 6 and 7.

In at least one embodiment, multiple levels of pollers can be used can be used to poll event queues, where the event queues can generally by CQs or other queues that are polled to signal or provide notification of new events. In at least one embodiment, pollers can be partitioned into two levels or groupings. In at least one embodiment, a first level poller and a second level poller can be responsible for polling for new events of each HW component.

In at least one embodiment, the first level poller can check for a general indication of whether there are any new events (e.g., at least one new event) in an event queue of a HW component. If the first level poller determines there are one or more new events to be processed, then the second level poller can be executed. In at least one embodiment, an event queue can include indicators or signals of new events to be handled or processed. In at least one embodiment, a memory flag or indicator associated with the event queue can denote whether the event queue has any new events waiting to be handled or processed, where the first level poller can check the memory flag or indicator to determine whether there are any new events waiting to be processed in the corresponding event.

The second level poller can be responsible for scanning the event queue entries for the new one or more events and handling processing of those events. In this manner, the second level poller does not waste CPU or processor time and can be invoked if there are outstanding or new events, as indicated by the corresponding first level poller. Using the first level poller allows for fast efficient recognition of whether there are any new events at all rather than simply scanning all entries of the event queue for any new event occurrences. Thus the first level poller can be quick and efficient. In at least one embodiment, the first level pollers can be called at a first polling frequency that is more frequent that any second polling frequency of any second level poller. In at least one embodiment, the first level pollers can be threads that are called inline from the scheduler to avoid incurring the CPU overhead that can be associated with context-switching. In at least one embodiment, inlining the first level pollers into the scheduler code can result in including the code of the first level pollers directly into the code of the scheduler to eliminate call-linkage overhead such as context switching. In such an embodiment where code of the first level pollers is included inline in the scheduler, the first lever pollers can execute in the context of the scheduler without performing a context switch.

In at least one embodiment, all first level pollers can be called to check corresponding event queues for any new events. Subsequently, second level pollers can be called for those event queues, as determined by the first level pollers, as having new events to be processed. Additionally in at least one embodiment, the particular second level pollers called at a particular point in time (following completion of the first level polling cycle by all first level pollers) can be based, at least in part, on priorities assigned to the second level pollers and/or target poller periods or polling frequencies assigned to the second level pollers.

In at least one embodiment, each of the second level pollers (and thus more generally each second level poller's corresponding HW component and interface) can be assigned a priority denoting a relative importance with respect to other remaining second level pollers. In at least one embodiment, the priority assigned to a particular second level poller can denote the influence or impact of any corresponding incurred wait time on critical work flows. In at least one embodiment, the priority assigned to a particular second level poller can denote the influence or impact the second level poller and this its associated HW component has, or is expected to have, on latency of critical flows such as I/O workflows. In at least one embodiment, the priority assigned to a particular second level poller can denote the influence or impact on latency of any corresponding wait time incurred by an event of the event queue associated with, and processed by, the second level controller.

In at least one embodiment, the priority assigned to a particular second level poller and thus also its HW component can be based, at least in part, on the impact the particular HW component has on latency of critical flows such as I/O workflows used in servicing I/Os. Thus in at least one embodiment, a first set of second level pollers (and thus corresponding HW components) associated with events that impact I/O latency, I/O latency sensitive workflows, and/or other critical or important workflows can be assigned a higher relative priority than other second level pollers and HW components that may generally have a lesser impact on such critical workflows and I/O latency. In at least one embodiment, a first set of second level pollers associated with events that impact I/O latency, I/O latency sensitive workflows and/or other critical or important workflows can be assigned a higher relative priority than a second set of second level pollers associated with events impacting non-critical workflows or workflows characterized as not I/O latency sensitive such as, for example, a background (BG) workflows. In at least one embodiment, a BG workflow can be performed during periods of low or idle workload (e.g., below a specified workload threshold such as where CPU utilization is below a threshold utilization).

In at least one embodiment, the first level pollers can be run before each scheduler cycle such as prior to the CPU scheduler dequeuing the next task for execution by the CPU.

In at least one embodiment, a second level poller with outstanding events and a corresponding priority above a predefined priority threshold can be called immediately after, or in response to, completion of polling by all first level pollers. Thus in at least one embodiment, such second level pollers with corresponding priorities above the priority threshold can denote high priority second level pollers called or invoked after the first level polling has completed. In at least one embodiment, calling or invoking a second level poller can cause the second level polling to perform processing of a corresponding polling cycle. In at least one embodiment, a single polling cycle performed by the second level poller can include the second level poller traversing its one or more corresponding event queues for any new events to be processed. Thus in at least one embodiment at each occurrence of a polling cycle, the corresponding second level poller can traverse its one or more corresponding event queues for any new or outstanding events to be processed.

In at least one embodiment, a second level poller with outstanding events and a corresponding priority equal to, or below, the predefined priority threshold can be characterized as having a normal priority denoting a lower priority relative to second level pollers having a corresponding priority greater than the predefined priority threshold.

In at least one embodiment, a second level poller with outstanding events and a corresponding priority equal to, or below, the predefined priority threshold can be called (e.g., invoked, run or executed) after completion of the first level polling based on its corresponding target poller period such that the second level poller can be called every "target poller period" units of time. In this manner, the target poller period can denote a polling frequency or rate at which the corresponding second level poller performs a polling cycle. In at least one embodiment, a single polling cycle performed by the second level poller can include the second level poller traversing its one or more corresponding event queues for any events to be processed. Thus in at least one embodiment at each occurrence of a polling cycle, the corresponding second level poller can traverse its one or more corresponding event queues for any events to be processed. For example, for a second level poller POLL1 with outstanding events and a corresponding priority equal to, or below, the predefined priority threshold, POLL1 may have been called at a polling frequency of every 1 second such that only 1 second has elapsed since POLL1 was last invoked. POLL1 may have a target poller period denoting a polling frequency of every 1.5 seconds and may not be called at the current time. As such, processing can wait another one or more first level polling cycles to complete for another 0.5 seconds to elapse before calling POLL1 to commence second level polling.

In at least one embodiment, each second level poller can be assigned a corresponding target poller period (e.g., polling frequency or rate) based, at least in part, on one or more metrics. For example, the target poller period for a second level poller can indicate to perform a polling cycle every X seconds, microseconds, milliseconds or other suitable unit of time, where X can generally be any suitable numeric value. In at least one embodiment, the one or more metrics can include any of: a number of events received in some predefined time duration (e.g., a new event rate such as a number of events per second or other suitable time unit); and a number of CPU cycles or an amount of CPU time consumed per event (e.g., to process each event). In at least one embodiment, the number of CPU cycles or amount of time consumed to process each event of a particular second level poller can be an average amount of CPU time consumed, or expected to be consumed. For example in at least one embodiment, the average amount of CPU time consumed to process an event of an event queue associated with a particular second level poller can be based on measured or observed CPU time consumed when processing events associated with the event queue of the particular second level poller (e.g., on average X seconds, microseconds, or milliseconds of CPU time is consumed to process a single event associated with the particular second level poller).

In at least one embodiment where the second level poller has a corresponding priority above the predefined priority threshold, the second level poller can be characterized as high priority such that the second level poller's corresponding target poller time period or polling frequency can be ignored for purposes of determining when to call the second level poller. Rather in at least one embodiment, the high priority second level poller with new or outstanding events can be called or invoked subsequent to all first level pollers completing their polling, where the second level poller is called or invoked independent of the second level poller's corresponding target poller time period or polling frequency.

In at least one embodiment, rather than have all first level pollers simply determine whether there are any new events in connection with corresponding event queues, each of one or more of the first level pollers can utilize a count or quantity denoting a number of outstanding or new events in a particular corresponding event queue. In at least one embodiment, a count or quantity, N_OUTSTANDING, denoting the current number of outstanding or new events in a particular event queue can be maintained and used by a first level poller. Additionally, AVE denoting an average number of events in the event queue can also be maintained and used by the first level poller. The first level poller can check the value of the count, N_OUTSTANDING, for the event queue. In at least one embodiment, if N_OUTSTANDING is greater than the AVE for the event queue by a predefined threshold amount, the second level poller associated with the event queue can be executed immediately (after all first level polling completes) even if its priority is equal to or less than the predefined priority threshold. The foregoing can be done in efforts to reduce latency. For example, while a single I/O corresponding to a single event of the event queue can wait and incur a negligible latency impact, if there are 100 I/Os corresponding to 100 events of the event queue, the impact on latency can be much more significant. Put another way if there are 100 I/Os or events denoting a burst of high I/O activity greater than N_OUTSTANDING, then processing can be performed to process or handle the 100 events corresponding to the burst of I/Os.

In at least one embodiment, communication queues of an interface of a HW component can be partitioned and maintained by multiple first level pollers and multiple second level pollers. In at least one embodiment, high priority queues associated with critical or latency sensitive workflows can be maintained using a first set of critical pollers including one or more first level pollers and one or more second level pollers; and lower priority queues associated with non-critical or non-latency sensitive workflows can be maintained using a second set of non-critical pollers including one or more first level pollers and one or more second level pollers.

Figure 8:
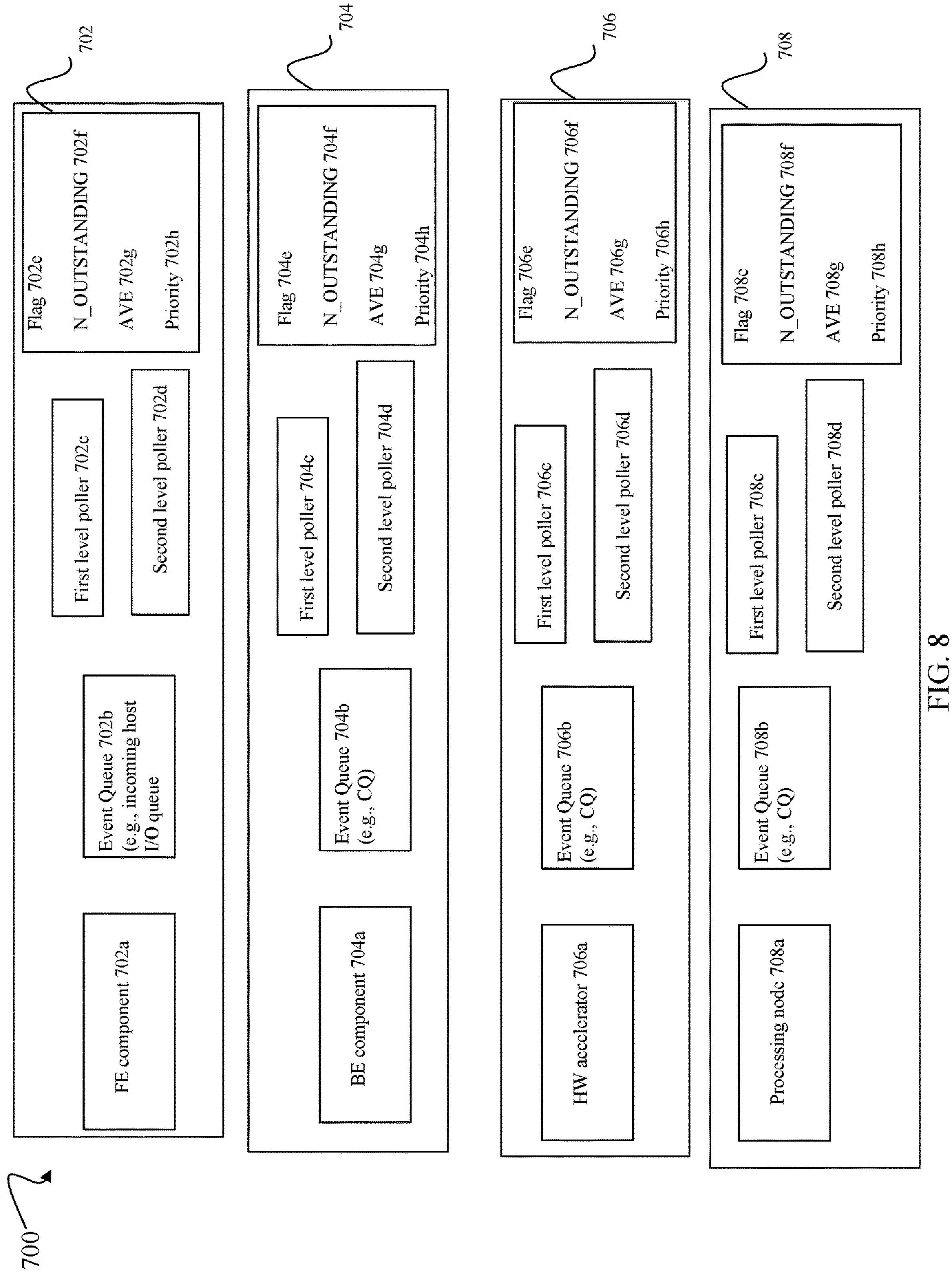

Referring to FIG. 8, shown is an example of 700 of components that can be used in at least one embodiment in accordance with the techniques of the present disclosure. The example 700 illustrates the first and second level pollers associated with the various HW components and event queues in at least one embodiment in accordance with the techniques of the present disclosure.

The example 700 includes: the element 702 denoting a set of components and values corresponding to the FE component with a corresponding interface used to receive host I/Os; the element 704 denoting a set of components and values corresponding to the BE component of a disk drive with a corresponding interface used to access a disk drive; the element 706 denoting a set of components and values corresponding to the HW accelerator with a corresponding interface used to communicate with the HW accelerator; and the element 706 denoting a set of components and values corresponding to a processing node or more generally HW component that receives messages from another node or HW component.

The element 702 includes the FE component 702*a*, the event queue 702*b* (e.g., corresponding to the incoming host I/O queue), the first level poller 702*c*, the second level poller 702*d*, the flag or indicator 702*c*, N_OUTSTANDING 702*f*, AVE 702*g* and priority 702*h*. The first level poller 702*c* can be responsible for performing first level polling of events of the event queue 702*b* for the FE component. As noted above in at least one embodiment, the flag 702*e* can be a Boolean flag or bit flag stored in memory where the flag 702*c* can be true or 1 if the event queue 702*b* includes any events that are outstanding and have not been processed. Otherwise flag 702*e* can be zero or false. The priority 702*h* can be the priority assigned to the second level poller 702*d* and thus to the FE component 702*a*. The priority 702*h* can denote a relative priority or importances such as relative to other assigned priorities of other second level pollers and corresponding HW components. In at least one embodiment, the priority 702*h* can be one of a defined set of multiple priorities denoted using integer values or other classifications that can be used to rank or prioritize the various second level pollers and corresponding HW components.

Alternatively or in addition to using the flag 702*e*, the values 702*f-g* can be used to determine when to execute or call the second level poller 702*d* to poll the event queue 702*b*. The value N_OUTSTANDING 702*f* can denote the current number of events or outstanding events in the event queue 702*b* for the FE component 702*a*. The value AVE 702*g* can denote the average number of events in the event queue 702*b*. If N_OUTSTANDING 702*f* is larger AVE 702*g* by at least a specified threshold amount, then the second level poller 702*d* can be executed immediately to poll the event queue 702*b* even if its priority is lower than the predefined priority threshold.

The element 704 includes the BE component 704*a*, the event queue 704*b*, the first level poller 704*c*, the second level poller 704*d*, the flag or indicator 704*c*, N_OUTSTANDING 704*f*, AVE 704*g* and priority 704*h*. The first level poller 704*c* can be responsible for performing first level polling of events of the event queue 704*b*. As noted above in at least one embodiment, the flag 704*e* can be a Boolean flag or bit flag stored in memory where the flag 704*e* can be true or 1 if the event queue 704*b* includes any events that are outstanding and have not been processed. Otherwise flag 704*c* can be zero or false. The priority 704*h* can be the priority assigned to the second level poller 704*d* and thus to the BE component 704*a*. The priority 704*h* can denote a relative priority or importances such as relative to other assigned priorities of other second level pollers and corresponding HW components. In at least one embodiment, the priority 704*h* can be one of a defined set of multiple priorities denoted using integer values or other classifications that can be used to rank or prioritize the various second level pollers and corresponding HW components.

Alternatively or in addition to using the flag 704*c*, the values 704*f-g* can be used to determine when to execute or call the second level poller 704*d* to poll the event queue 704*b*. The value N_OUTSTANDING 704*f* can denote the current number of events or outstanding events in the event queue 704*b* for the FE component 704*a*. The value AVE 704*g* can denote the average number of events in the event queue 704*b*. If N_OUTSTANDING 704*f* is larger AVE 704*g* by at least a specified threshold amount, then the second level poller 704*d* can be executed immediately to poll the event queue 704*b* even if its priority is lower than the predefined priority threshold.

The element 706 includes the HW accelerator component 706*a*, the event queue 706*b*, the first level poller 706*c*, the second level poller 706*d*, the flag or indicator 706*c*, N_OUTSTANDING 706*f*, AVE 706*g* and priority 706*h*. The first level poller 706*c* can be responsible for performing first level polling of events of the event queue 706*b*. As noted above in at least one embodiment, the flag 706*e* can be a Boolean flag or bit flag stored in memory where the flag 706*e* can be true or 1 if the event queue 706*b* includes any events that are outstanding and have not been processed. Otherwise flag 706*e* can be zero or false. The priority 706*h* can be the priority assigned to the second level poller 706*d* and thus to the HW accelerator 706*a*. The priority 706*h* can denote a relative priority or importances such as relative to other assigned priorities of other second level pollers and corresponding HW components. In at least one embodiment, the priority 704*h* can be one of a defined set of multiple priorities denoted using integer values or other classifications that can be used to rank or prioritize the various second level pollers and corresponding HW components.

Alternatively or in addition to using the flag 706*e*, the values 706*f-g* can be used to determine when to execute or call the second level poller 706*d* to poll the event queue 706*b*. The value N_OUTSTANDING 706*f* can denote the current number of events or outstanding events in the event queue 706*b* for the HW accelerator 706*a*. The value AVE 706*g* can denote the average number of events in the event queue 706*b*. If N_OUTSTANDING 706*f* is larger AVE 706*g* by at least a specified threshold amount, then the second level poller 706*d* can be executed immediately to poll the event queue 706*b* even if its priority is lower than the predefined priority threshold.

The element 708 includes a node as the HW component 708*a*, the event queue 708*b*, the first level poller 708*c*, the second level poller 708*d*, the flag or indicator 708*c*, N_OUTSTANDING 708*f*, AVE 708*g* and priority 708*h*. The first level poller 708*c* can be responsible for performing first level polling of events of the event queue 708*b*. As noted above in at least one embodiment, the flag 708*e* can be a Boolean flag or bit flag stored in memory where the flag 708*e* can be true or 1 if the event queue 708*b* includes any events that are outstanding and have not been processed. Otherwise flag 708*e* can be zero or false. The priority 708*h* can be the priority assigned to the second level poller 708*d* and thus to the node 708*a*. The priority 708*h* can denote a relative priority or importances such as relative to other assigned priorities of other second level pollers and corresponding HW components. In at least one embodiment, the priority 704*h* can be one of a defined set of multiple priorities denoted using integer values or other classifications that can be used to rank or prioritize the various second level pollers and corresponding HW components.

Alternatively or in addition to using the flag 708*e*, the values 708*f-g* can be used to determine when to execute or call the second level poller 708*d* to poll the event queue 708*b*. The value N_OUTSTANDING 706*f* can denote the current number of events or outstanding events in the event queue 708*b*. The value AVE 708*g* can denote the average number of events in the event queue 708*b*. If N_OUTSTANDING 708*f* is larger AVE 708*g* by at least a specified threshold amount, then the second level poller 708*d* can be executed immediately to poll the event queue 708*b* even if its priority is lower than the predefined priority threshold.

In at least one embodiment, if a first level poller such as 702*c* does not support the lightweight checking of examining a corresponding flag value such as 702*e*, then the first level poller 702*c* can be modified to support such a checking of the flag value 702*e* as an indication of new events in the event queue 702*b*.

In at least one embodiment, each second level poller associated with a corresponding event queue can performing polling that includes traversing or checking each entry of event queue for new or outstanding entries in a single polling cycle. For each new or outstanding entry signaling a new event, the second level poller can read and process the new event. In at least one embodiment, when the second level poller is done processing an event queue entry, the event queue entry and any associated other queue entries, buffers and the like can be freed or reclaimed and reused.

As one variation to the embodiment of FIG. 8, a single first level poller can be used to perform first level polling of all event queues 702*b*, 7084*b*, 706*b* and 708*b*.

In at least one embodiment, events of the single event queue associated with a single HW component can be partitioned into two types or classifications of events: critical and non-critical. In such an embodiment, rather than have a single event queue, the single HE component can be associated with two event queues, a critical event queue and a non-critical event queue, where events classified as critical can be placed on the critical event queue, and where events classified as non-critical can be placed on the non-critical event queue. In at least one embodiment, an event can be classified as critical or non-critical based, at least in part, on the thread that generated the event or was performing processing that generated the event. Since the thread can be part of some larger overall workflow, a thread and thus events generated by the thread can have a classification of critical or non-critical based on the overall workflow. For example, if a thread of a BG workflow is executing and result in generating an event, the event can be classified as non-critical and placed on the non-critical event queue sine BG workflow processing can be considered non-critical and not I/O latency sensitive. In contrast, if a thread 2 of an I/O workflow is executing and results in generating an event, the event can be classified as critical and placed in the critical event queue since the I/O workflow can be considered critical and latency sensitive. Additionally, in at least one embodiment, the non-critical event queue can have its own dedicated first and second level pollers, and the critical event queue can have its own dedicated first and second level pollers.

Figure 9:
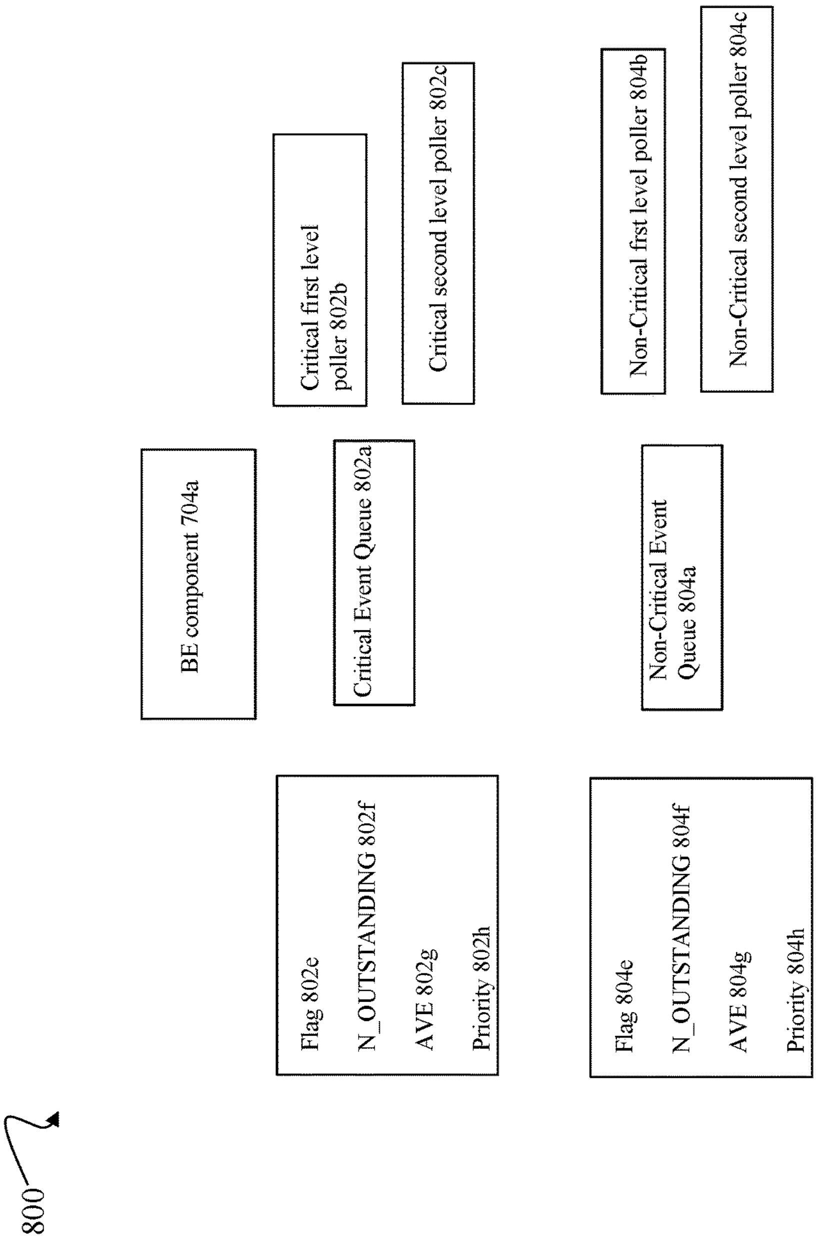

For example, reference is made to the example 800 of FIG. 9 illustrating use of critical and non-critical pollers for the BE component 704*a* and its associated components and values. The example 800 includes a critical event queue 802*a*, a critical first level poller 802*b* and a critical second level poller 802*c* where pollers 802*b-c* can be dedicated first and second level pollers as described herein for polling the critical event queue 802*a*. The example 800 includes a non-critical event queue 804*a*, critical first level poller 804*b* and critical second level poller 804*c* where pollers 804*b-c* can be dedicated first and second level pollers as described herein for polling the non-critical event queue 804*a*.

In the example 800, the critical event queue 802*a* can have its own set of corresponding data values for: the flag 802*e*, N_OUTSTANDING 804*f*, AVE 802*g*, and priority 802*h*, where such values can be used as discussed above with other event queues.

In the example 800, the non-critical event queue 804*a* can have its own set of corresponding data values for: the flag 804*c*, N_OUTSTANDING 804*f*, AVE 804*g*, and priority 804*h*, where such values can be used as discussed above with other event queues.

In at least one embodiment, the priority 802*h* assigned to the critical second level poller 802*c* can be greater than the priority 804*h* assigned to the non-critical second level poller 804*c*.

Figure 10:
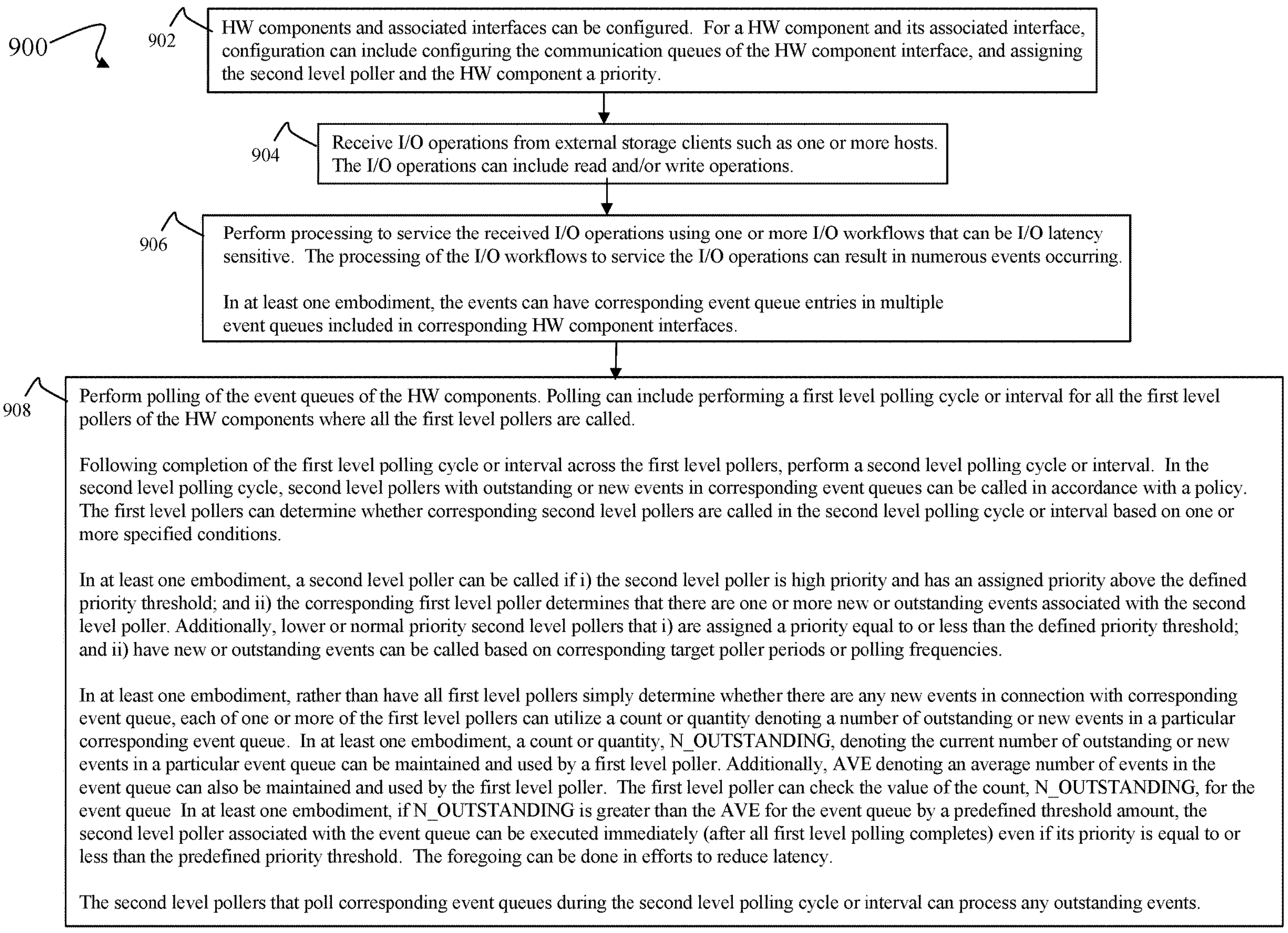
FIG. 10 is a flowchart of processing steps that can be performed in at least one embodiment in accordance with the techniques of the present disclosure.

Referring to FIG. 10, shown is a flowchart 900 of processing steps that can be performed in at least one embodiment in accordance with the techniques of the present disclosure.

The steps of FIG. 10 summarize processing discussed above.

At the step 902, HW components and their associated interfaces can be configured. For a HW component and its associated interface, configuration can include configuring the communication queues of the HW component interface, and assigning a priority to the second level poller and the HW component. From the step 902, control proceeds to the step 904.

At the step 904, I/O operations can be received at the storage system from external storage clients such as one or more hosts. The I/O operations can include read and/or write operations. From the step 904, control proceeds to the step 906.

At the step 906, processing is performed to service the received I/O operations using one or more I/O workflows that can be I/O latency sensitive. The processing of the I/O workflows to service the I/O operations can result in numerous events occurring in connection with one or more of the HW components configured in the step 902. In at least one embodiment, the events can have corresponding event queue entries in multiple event queues included in corresponding HW component interfaces. From the step 906, control proceeds to the step 908.

At the step 908, processing can include polling the event queues of the HW components. Polling can include performing a first level polling cycle or interval for all the first level pollers of the HW components where all the first level pollers are called.

Following completion of the first level polling cycle or interval across the first level pollers, perform a second level polling cycle or interval. In the second level polling cycle, second level pollers with outstanding or new events in corresponding event queues can be called in accordance with a policy. The first level pollers can determine whether corresponding second level pollers are called in the second level polling cycle or interval based on one or more specified conditions.

In at least one embodiment, a second level poller can be called if i) the second level poller is high priority and has an assigned priority above the defined priority threshold; and ii) the corresponding first level poller determines that there are one or more new or outstanding events associated with the second level poller. Additionally, lower or normal priority second level pollers that i) are assigned a priority equal to or less than the defined priority threshold; and ii) have new or outstanding events can be called based on corresponding target poller periods or polling frequencies.

In at least one embodiment, rather than have all first level pollers simply determine whether there are any new events in connection with corresponding event queues, each of one or more of the first level pollers can utilize a count or quantity denoting a number of outstanding or new events in a particular corresponding event queue. In at least one embodiment, a count or quantity, N_OUTSTANDING, denoting the current number of outstanding or new events in a particular event queue can be maintained and used by a first level poller. Additionally, AVE denoting an average number of events in the event queue can also be maintained and used by the first level poller. The first level poller can check the value of the count, N_OUTSTANDING, for the event queue. In at least one embodiment, if N_OUTSTANDING is greater than the AVE for the event queue by a predefined threshold amount, the second level poller associated with the event queue can be executed immediately (after all first level polling completes) even if its priority is equal to or less than the predefined priority threshold. The foregoing can be done in efforts to reduce latency.

In the step 908, the second level pollers that poll corresponding event queues during the second level polling cycle or interval can process any outstanding events.

The step 908 can generally describe polling of the event queues of the HW components using multiple levels of pollers. In at least one embodiment, the step 908 can be repeated in an ongoing manner. In at least one embodiment, the first level pollers can be called at a first polling frequency that denotes a higher frequency than polling frequencies associated for any of the second level pollers.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:

receiving a plurality of I/O operations at a system;

servicing the plurality of I/O operations, wherein said servicing the plurality of I/O operations causes a plurality of events in connection with a plurality of hardware components; and polling a plurality of event queues associated with the plurality of hardware components, wherein each of the plurality of event queues indicates outstanding events of a corresponding one of the plurality of hardware components, wherein said polling includes:

performing a first level polling cycle or interval, including calling a first plurality of first level pollers, wherein each of the first level pollers of the first plurality polls a corresponding one of the plurality of event queues to determine whether said corresponding one event queue has any outstanding events; and responsive to completing the first level polling cycle or interval, performing a second level polling cycle or interval, including calling a first set of one or more of a second plurality of second level pollers based on one or more conditions.

2. The computer-implemented method of claim 1, wherein each of the first level pollers of the first plurality checks a first current value in a memory location indicating whether the corresponding one of the plurality event queues associated with said each first level poller includes any outstanding events.

3. The computer-implemented method of claim 2, wherein the first current value is a Boolean indicator or flag having a value of yes or true if said corresponding one of the plurality of event queues has at least one outstanding event, and wherein otherwise said first current value is no or false.

4. The computer-implemented method of claim 2, wherein the one or more conditions includes a condition specifying that each of the second plurality of second level pollers called in the second level polling cycle or interval has at least one outstanding event in a respective one of the plurality of event queues polled by said each second level poller.

5. The computer-implemented method of claim 4, wherein, for each of the plurality of event queues, one of the first plurality of first level pollers associated with said each event queue determines, during the first level polling cycle or interval and using the respective first current value, whether said each event queue includes any outstanding events.

6. The computer-implemented method of claim 2, wherein the one or more conditions includes a condition specifying that if i) one of the second plurality of second level pollers has a corresponding priority above a priority threshold; and ii) a corresponding one of the plurality of event queues polled by said one second level poller has at least one outstanding event, then said one second level poller is included in the first set where said one second level poller is called in the second level polling cycle or interval.

7. The computer-implemented method of claim 2, wherein the one or more conditions includes a condition specifying that if i) one of the second plurality of second level pollers has a corresponding priority that is equal to or less than a priority threshold; and ii) a corresponding one of the plurality of event queues polled by said one second level poller has at least one outstanding event, then whether said one second level poller is called in the second level polling cycle is based, at least in part, on a corresponding polling frequency specified for said one second level poller.

8. The computer-implemented method of claim 7, further comprising:

determining, by a respective one of the first plurality of first level pollers, whether the corresponding one of the plurality of event queues polled by said one second level poller has at least one outstanding event.

9. The computer-implemented method of claim 2, wherein the one or more conditions includes a condition specifying, for one of the second plurality of second level pollers, that if a corresponding one of the plurality of event queues polled by said one second level poller has a first quantity of outstanding events, where the first quantity exceeds a first average number of events in said corresponding one event queue by at least a first threshold amount, then said one second level poller is called in the second level polling cycle.

10. The computer-implemented method of claim 9, wherein the first quantity exceeds the first average number of events by at least said first threshold amount, wherein said one second level poller has an assigned priority that is less than a specified priority threshold, and wherein said one or more conditions includes a second condition specifying that said one second level poller is called in the second level polling cycle independent of an assigned polling priority of said one second level poller.

11. The computer-implemented method of claim 1, where the plurality of hardware components includes a front-end (FE) hardware component that receives the plurality of I/Os from one or more hosts.

12. The computer-implemented method of claim 11, wherein a first of the second plurality of second level pollers is configured to poll a first of the plurality of event queues associated with the FE hardware component for incoming I/Os received at the system.

13. The computer-implemented method of claim 1, where the plurality of hardware components includes a back-end (BE) hardware component including a first storage device.

14. The computer-implemented method of claim 13, wherein a first of the second plurality of second level pollers is configured to poll a first of the plurality of event queues associated with the BE hardware component for completion of BE I/Os that access the first storage device.

15. The computer-implemented method of claim 1, where the plurality of hardware components includes a hardware accelerator component that performs any of: encryption, decryption, compression, and decompression.

16. The computer-implemented method of claim 15, wherein a first of the second plurality of second level pollers is configured to poll a first of the plurality of event queues associated with the hardware accelerator component for completion of requests issued to the hardware accelerator component to perform one or more operations.

17. The computer-implemented method of claim 1, where the plurality of hardware components includes a first processing node and a second processing node, wherein the method includes:

the first processing node and the second processing node exchanging messages in connection with servicing a first of the plurality of I/O operations.

18. The computer-implemented method of claim 17, wherein a first of the second plurality of second level pollers is configured to poll a first of the plurality of event queues associated with the first node, and wherein a second of the second plurality of second level pollers is configured to poll a second of the plurality of event queues associated with the second node.

19. A non-transitory computer readable medium comprising code stored thereon that, when executed, performs a method comprising:

receiving a plurality of I/O operations at a system;

servicing the plurality of I/O operations, wherein said servicing the plurality of I/O operations causes a plurality of events in connection with a plurality of hardware components; and polling a plurality of event queues associated with the plurality of hardware components, wherein each of the plurality of event queues indicates outstanding events of a corresponding one of the plurality of hardware components, wherein said polling includes:

performing a first level polling cycle or interval, including calling a first plurality of first level pollers, wherein each of the first level pollers of the first plurality polls a corresponding one of the plurality of event queues to determine whether said corresponding one event queue has any outstanding events; and responsive to completing the first level polling cycle or interval, performing a second level polling cycle or interval, including calling a first set of one or more of a second plurality of second level pollers based on one or more conditions.

20. A system comprising:

one or more processors; and a memory comprising code stored thereon that, when executed, performs a method comprising:

receiving a plurality of I/O operations at a system;

servicing the plurality of I/O operations, wherein said servicing the plurality of I/O operations causes a plurality of events in connection with a plurality of hardware components; and polling a plurality of event queues associated with the plurality of hardware components, wherein each of the plurality of event queues indicates outstanding events of a corresponding one of the plurality of hardware components, wherein said polling includes:

performing a first level polling cycle or interval, including calling a first plurality of first level pollers, wherein each of the first level pollers of the first plurality polls a corresponding one of the plurality of event queues to determine whether said corresponding one event queue has any outstanding events; and responsive to completing the first level polling cycle or interval, performing a second level polling cycle or interval, including calling a first set of one or more of a second plurality of second level pollers based on one or more conditions.

* * * * *